(12) United States Patent
Cioffi et al.

(10) Patent No.: US 9,941,928 B2
(45) Date of Patent: Apr. 10, 2018

(54) SYSTEMS, METHODS, AND APPARATUSES FOR IMPLEMENTING A DSL SYSTEM

(71) Applicant: ADAPTIVE SPECTRUM AND SIGNAL ALIGNMENT, INC., Redwood City, CA (US)

(72) Inventors: John M. Cioffi, Atherton, CA (US); Wonjong Rhee, San Francisco, CA (US); George Ginis, San Mateo, CA (US); Mark H. Brady, Stanford, CA (US); Peter J. Silverman, Evanston, IL (US)

(*) Notice: Subject to any disclaimer, the term of this patent is extended or adjusted under 35 U.S.C. 154(b) by 5 days.

(21) Appl. No.: 14/605,911

(22) Filed: Jan. 26, 2015

(65) Prior Publication Data

US 2015/0222326 A1    Aug. 6, 2015

Related U.S. Application Data

(63) Continuation of application No. 13/916,493, filed on Jun. 12, 2013, now abandoned, which is a continuation of application No. 12/227,966, filed as application No. PCT/US2007/013393 on Jun. 6, 2007, now Pat. No. 8,483,369.

(60) Provisional application No. 60/811,355, filed on Jun. 6, 2006.

(51) Int. Cl.
   *H04L 5/14*   (2006.01)
   *H04B 3/32*   (2006.01)

(52) U.S. Cl.
   CPC ............. *H04B 3/32* (2013.01); *H04L 5/1438* (2013.01)

(58) Field of Classification Search
   CPC ................................ H04L 47/10; H04L 47/30
   See application file for complete search history.

(56) References Cited

U.S. PATENT DOCUMENTS

| | | | |
|---|---|---|---|
| 4,733,395 | A | 3/1988 | Gelbrich et al. |
| 4,901,319 | A | 2/1990 | Ross |
| 5,023,872 | A | 6/1991 | Annamalai |
| 5,181,198 | A | 1/1993 | Lechleider |

(Continued)

FOREIGN PATENT DOCUMENTS

| | | |
|---|---|---|
| DE | 4444312 | 12/1994 |
| EP | 1207665 | 5/2002 |

(Continued)

OTHER PUBLICATIONS

Non-Final Office Action for U.S. Appl. No. 11/336,666, dated Nov. 13, 2008, 27 pages.

(Continued)

*Primary Examiner* — Zhiren Qin
(74) *Attorney, Agent, or Firm* — North Weber & Baugh LLP

(57) ABSTRACT

An apparatus comprises at least one vectoring engine and a cross-connect coupled to the vectoring engine. The cross-connect is to couple with each of a plurality of customer premises equipment (CPE) devices via a respective DSL loop. An interface is to receive instructions for the cross-connect to couple the vectoring engine to a nonoverlapping subset of the CPE devices via the respective DSL loops. The interface is further to receive instructions for the vectoring engine to apply vectoring to the DSL loop via which to couple one of the CPE devices to the cross-connect.

23 Claims, 20 Drawing Sheets

(56) References Cited

U.S. PATENT DOCUMENTS

| | | | |
|---|---|---|---|
| 5,319,674 A | 6/1994 | Cherubini | |
| 5,450,420 A | 9/1995 | An et al. | |
| 5,479,447 A | 12/1995 | Chow et al. | |
| 5,510,917 A | 4/1996 | Corke et al. | |
| 5,511,119 A | 4/1996 | Lechleider | |
| 5,533,012 A | 7/1996 | Fukasawa et al. | |
| 5,541,955 A | 7/1996 | Jacobsmeyer | |
| 5,621,768 A | 4/1997 | Lechleider | |
| 5,901,205 A | 5/1999 | Smith et al. | |
| 5,991,311 A | 11/1999 | Long et al. | |
| 6,067,646 A | 5/2000 | Starr | |
| 6,075,821 A | 6/2000 | Kao et al. | |
| 6,134,273 A | 10/2000 | Wu et al. | |
| 6,134,274 A | 10/2000 | Sankaranarayanan | |
| 6,147,963 A | 11/2000 | Walker et al. | |
| 6,240,126 B1 | 5/2001 | Ohashi et al. | |
| 6,272,652 B1 | 8/2001 | Starr | |
| 6,310,909 B1 | 10/2001 | Jones | |
| 6,314,135 B1 | 11/2001 | Schneider et al. | |
| 6,359,923 B1 | 3/2002 | Agee et al. | |
| 6,393,052 B2 | 5/2002 | Sadjadpour et al. | |
| 6,408,033 B1 | 6/2002 | Chow et al. | |
| 6,449,288 B1 | 9/2002 | Chari et al. | |
| 6,507,608 B1 | 1/2003 | Norrell | |
| 6,536,001 B1 | 3/2003 | Cai et al. | |
| 6,546,509 B2 | 4/2003 | Starr | |
| 6,597,745 B1 | 7/2003 | Dowling | |
| 6,598,188 B1 | 7/2003 | Locke et al. | |
| 6,629,249 B2 | 9/2003 | Gonzalez | |
| 6,636,603 B1 | 10/2003 | Milbrandt | |
| 6,704,351 B1 | 3/2004 | Ott et al. | |
| 6,744,811 B1 | 6/2004 | Kantschuk | |
| 6,751,255 B1 | 6/2004 | Reuven et al. | |
| 6,754,186 B1 | 6/2004 | Bullman | |
| 6,778,505 B1 | 8/2004 | Bullman et al. | |
| 6,792,049 B1 | 9/2004 | Bao et al. | |
| 6,804,267 B1 | 10/2004 | Long et al. | |
| 6,870,888 B1 | 3/2005 | Shapiro et al. | |
| 6,870,901 B1 | 3/2005 | Gudmundsson et al. | |
| 6,940,973 B1 | 9/2005 | Yeap et al. | |
| 6,967,996 B1 | 11/2005 | Cai et al. | |
| 6,970,415 B1 | 11/2005 | Galarza et al. | |
| 6,970,560 B1 | 11/2005 | Hench et al. | |
| 6,978,015 B1 | 12/2005 | Erickson et al. | |
| 6,990,196 B2 | 1/2006 | Zeng et al. | |
| 7,016,822 B2 | 3/2006 | Bosley et al. | |
| 7,103,004 B2 | 9/2006 | Wang | |
| 7,110,467 B2 | 9/2006 | Mitlin et al. | |
| 7,123,651 B2 | 10/2006 | Altekar et al. | |
| 7,131,038 B2 | 10/2006 | Mitlin et al. | |
| 7,158,563 B2 | 1/2007 | Ginis et al. | |
| 7,315,553 B2 | 1/2008 | Keller-Tuberg et al. | |
| 7,356,049 B1 | 4/2008 | Rezvani | |
| 7,386,040 B1 | 6/2008 | Cai et al. | |
| 7,796,544 B2 | 9/2010 | Hench | |
| 7,813,293 B2 | 10/2010 | Papandriopoulos et al. | |
| 2001/0055332 A1 | 12/2001 | Sadjadpour et al. | |
| 2002/0044610 A1 | 4/2002 | Jones | |
| 2002/0138811 A1 | 9/2002 | Bosley et al. | |
| 2002/0176368 A1 | 11/2002 | Reddy | |
| 2003/0072380 A1 | 4/2003 | Huang | |
| 2003/0081741 A1 | 5/2003 | Ramakrishna et al. | |
| 2003/0086362 A1 | 5/2003 | Hasegawa et al. | |
| 2003/0086514 A1 | 5/2003 | Ginis et al. | |
| 2003/0108095 A1 | 6/2003 | Duvaut et al. | |
| 2003/0112858 A1 | 6/2003 | Wang | |
| 2003/0117963 A1 | 6/2003 | Wang | |
| 2003/0235245 A1 | 12/2003 | Erdogan et al. | |
| 2004/0001552 A1 | 1/2004 | Koifman | |
| 2004/0021595 A1 | 2/2004 | Erdogan et al. | |
| 2004/0086064 A1 | 5/2004 | Van Acker et al. | |
| 2004/0095921 A1 | 5/2004 | Kerpez | |
| 2004/0096052 A1* | 5/2004 | Liu | H04M 1/738 379/399.01 |
| 2004/0109546 A1 | 6/2004 | Fishman | |
| 2004/0120411 A1 | 6/2004 | Walton et al. | |
| 2004/0120482 A1 | 6/2004 | Bentley et al. | |
| 2004/0239443 A1 | 12/2004 | Kottschiag et al. | |
| 2005/0047323 A1 | 3/2005 | Clarkson et al. | |
| 2005/0052988 A1 | 3/2005 | Tsatsanis et al. | |
| 2005/0053229 A1 | 3/2005 | Tsatsanis et al. | |
| 2005/0123028 A1 | 6/2005 | Cioffi et al. | |
| 2005/0129218 A1 | 6/2005 | Kimble et al. | |
| 2005/0135567 A1 | 6/2005 | Faulkner | |
| 2005/0152385 A1* | 7/2005 | Cioffi | H04B 3/32 370/420 |
| 2005/0175078 A1 | 8/2005 | Redfern | |
| 2005/0195892 A1 | 9/2005 | Ginis et al. | |
| 2005/0213718 A1 | 9/2005 | Reina | |
| 2005/0220179 A1 | 10/2005 | Tsatsanis | |
| 2005/0259725 A1* | 11/2005 | Cioffi | H04B 3/32 375/222 |
| 2005/0281229 A1 | 12/2005 | Girola et al. | |
| 2006/0002457 A1 | 1/2006 | Romano et al. | |
| 2006/0029147 A1 | 2/2006 | Tsatsanis | |
| 2006/0029148 A1 | 2/2006 | Tsatsanis | |
| 2006/0039456 A1 | 2/2006 | Bostoen et al. | |
| 2006/0056305 A1 | 3/2006 | Oksman et al. | |
| 2006/0056522 A1 | 3/2006 | Tsatsanis et al. | |
| 2006/0062288 A1 | 3/2006 | Hester | |
| 2006/0109779 A1 | 5/2006 | Shah et al. | |
| 2006/0133519 A1 | 6/2006 | Tsatsanis et al. | |
| 2006/0146945 A1 | 7/2006 | Chow et al. | |
| 2006/0153106 A1 | 7/2006 | Laakso et al. | |
| 2006/0173948 A1 | 8/2006 | Krawiec et al. | |
| 2006/0198430 A1 | 9/2006 | Rhee et al. | |
| 2006/0291576 A1 | 12/2006 | Dasgupta et al. | |
| 2007/0019681 A1 | 1/2007 | Wang | |
| 2007/0047631 A1* | 3/2007 | Bostoen | H04B 3/487 375/222 |
| 2007/0081582 A1 | 4/2007 | Ginis et al. | |
| 2007/0171940 A1 | 7/2007 | Chen | |
| 2009/0207985 A1 | 8/2009 | Cioffi et al. | |

FOREIGN PATENT DOCUMENTS

| | | |
|---|---|---|
| GB | 2315392 | 1/1998 |
| JP | 2006121459 | 5/2006 |
| WO | WO-95/31867 | 11/1995 |
| WO | WO-2001/35611 | 5/2001 |
| WO | WO-2003/105339 | 7/2001 |
| WO | WO-2004006492 | 1/2004 |
| WO | WO-2004027579 | 4/2004 |
| WO | WO-2005034459 | 4/2005 |
| WO | WO-2005094052 | 10/2005 |
| WO | WO-2005114861 | 12/2005 |
| WO | WO-2005114924 | 12/2005 |
| WO | WO-2006076689 | 7/2006 |
| WO | IB-2006129140 | 12/2006 |

OTHER PUBLICATIONS

Non-Final Office Action for U.S. Appl. No. 11/336,113, dated Nov. 12, 2008, 23 pages.
Non-Final Office Action for U.S. Appl. No. 11/344,873, dated Nov. 26, 2008, 20 pages.
Non-Final Office Action for U.S. Appl. No. 11/367,930, dated Jan. 9, 2009, 41 pages.
Non-Final Office Action for U.S. Appl. No. 11/344,873, dated Jul. 23, 2009, 14 pages.
Notice of Allowance and Fees for U.S. Appl. No. 11/367,930, dated Jul. 23, 2009, 8 pages.
Non-Final Office Action for U.S. Appl. No. 11/336,666, dated Jul. 31, 2009, 18 pages.
Office Action for European Patent Application No. 06710514.8 dated Jan. 20, 2009.
Non-Final Office Action for U.S. Appl. No. 11/267,623, dated Sep. 25, 2009, 28 Pages.
Notice of Allowance and Fees for U.S. Appl. No. 11/367,930, dated Oct. 1, 2009, 12 Pages.
Examination Report for European Application No. 06727343.3, dated Jan. 30, 2009, 4 pages.

(56) References Cited

OTHER PUBLICATIONS

Examiner's Report for Australian Application No. 2004298118, dated Jan. 13, 2009,2 pages.
Examiner's Report No. 2 for Australian Application No. 2004298118, dated Nov. 23, 2009,2 pages.
Non-Final Office Action for U.S. Appl. No. 11/336,113, dated Jan. 4, 2010, 13 pages.
Non-Final Office Action for U.S. Appl. No. 11/344,873, dated Jan. 12, 2010, 9 pages.
Final Office Action for U.S. Appl. No. 11/336,666, dated Jan. 20, 2010, 14 pages.
Final Office Action for U.S. Appl. No. 11/342,028, dated Jan. 25, 2010,16 Pages.
Final Office Action for U.S. Appl. No. 11/284,692, dated Feb. 4, 2010,25 pages.
Official Action for Australian Patent Application No. 2006245450, dated Feb. 19, 2010,3 pages.
Non-Final Office Action for China Patent Application No. 200680024116.2, dated Feb. 12, 2010,9 Pages.
Non-Final Office Action for China Patent Application No. 200680020929.4, dated Feb. 12, 2010,20 Pages.
Notice of Allowance and Fees for U.S. Appl. No. 11/267,623, dated Mar. 26, 2010,7 Pages.
Non-Final Office Action for China Application No. 200780021083.0, dated Apr. 1, 2010,6 Pages.
Non-Final Office Action for U.S. Appl. No. 12/185,729, dated Apr. 27, 2010,12 Pages.
Non-Final Office Action for China Patent Application No. 200680023934.0, dated Apr. 13, 2010,7 Pages.
Notice of Allowance and Fees for U.S. Appl. No. 11/284,692, dated Apr. 28, 2010,14 Pages.
First Office Action for CN200680020813.0, dated Jun. 5, 2009, 9pgs.
Second Office Action for CN200680020813.0, dated Nov. 13, 2009, 6 pgs.
Notice of Allowance for U.S. Appl. No. 12/185,729, dated Jun. 9, 2010,7 Pages.
Notice of Allowance for U.S. Appl. No. 11/336,666, dated May 27, 2010,8 Pages.
Non-Final Office Action for China Patent Application No. 200680022004.3, dated May 27, 2010,6 Pages.
International Preliminary Report on Patentability for PCT Application No. PCT/IB2006/000759, dated Dec. 21, 2007,9 Pages.
Non-Final Office Action for Australian Application No. 2006253893, dated Apr. 15, 2010,4 Pages.
Non-Final Office Action for European Application No. 06727405.0, dated Jan. 29, 2009,4 Pages.
Non-Final Office Action for China Application No. 200680027325.2, dated Aug. 4, 2010,8 Pages.
Supplemental Notice of Allowance for U.S. Appl. No. 11/336,113, dated Aug. 12, 2010,6 Pages.
Non-Final Office Action for European Application No. 06710580.9, dated Aug. 11, 2010,8 Pages.
Non-Final Office Action for China Application No. 200680023058.1, dated Sep. 2, 2010,11 Pages.
Non-Final Office Action for China Patent Application No. 200680020929.4, dated Sep. 14, 2010, 19 pages.
First Office Action dated Apr. 8, 2009 for European Application No. 06744467.9, dated Apr. 8, 2009, 6 pages.
Final Office Action for U.S. Appl. No. 11/336,666, dated May 13, 2009, 13 pages.
Final Office Action for U.S. Appl. No. 11/336,113, dated Jun. 24, 2009; 17 pages.
Non-Final Office Action for U.S. Appl. No. 11/342,028, dated Jun. 25, 2009; 13 pages.
Non-Final Office Action for U.S. Appl. No. 11/284,692, dated Jul. 8, 2009, 42 pages.
International Preliminary Report on Patentability for International Patent Application No. PCT/IB2006/000645, dated Dec. 21, 2007, 10 pages.
Office Action for Australian Patent Application No. 2006253892, dated Feb. 8, 2010, 2 pages.
Non-Final Office Action for U.S. Appl. No. 11/345,215, dated Nov. 15, 2010, 20 pages.
Non-Final Office Action for U.S. Appl. No. 11/342,028, dated Jan. 21, 2011, 14 pages.
Third Office Action for Chinese Patent Application No. 200680020929.4, dated Mar. 2, 2011, 9 pages.
Notice of Allowance for U.S. Appl. No. 11/345,215, dated Apr. 4, 2011, 16 pages.
International Preliminary Report on Patentability for International Patent Application No. PCT/US2007/013393, dated Dec. 24, 2008, 8 pages.
Non-Final Office Action for Chinese Patent Application No. 200680024116.2, dated Jul. 13, 2011, 11 pages.
Non-Final Office Action for JP Patent Application No. 2008-514211, dated Sep. 14, 2011, pages.
Office Action for Application No. 2008-510657, dated Aug. 16, 2011, 4 pages.
European Search Report for Application No. 11161331.1, dated May 19, 2011, 6 pages.
Office Action for Application No. 2008-510657, dated Aug. 16, 2011.
Office Action for European Patent Application No. 06710514.8, dated Sep. 12, 2011.
Third Office Action for Chinese Patent Application No. 200680024116.2, dated Nov. 16, 2011.
Non-Final Office Action for Japanese Patent Application No. 2008-510656, dated Dec. 13, 2011.
Notice of Allowance for Chinese Patent Application No. 200680022225.0, dated Jan. 16, 2012.
Office Action for Japanese Patent Application No. 2009-514370, dated Apr. 24, 2012.
Notice of Allowance for Chinese Patent Application No. 200680024116.2, dated Jun. 6, 2012.
Final Office Action for Japanese Patent Application No. 2008-514211, dated Jul. 24, 2012.
Non-Final Office Action for U.S. Appl. No. 12/227,966, dated Sep. 24, 2012.
Notice of Allowance for U.S. Appl. No. 11/342,028, dated Jul. 11, 2011, 10 pages.
Notice of Allowance for Japanese Patent Application No. 2008-510656, dated Nov. 20, 2012.
Decision of Grant for Japanese Patent Application No. 2009-514370, dated Jan. 28, 2013.
Non-Final Office Action for U.S. Appl. No. 13/194,736, dated Feb. 1, 2013.
Decision of Grant for Japanese Patent Application No. 2008-514211, dated Feb. 14, 2013.
Notice of Allowance for U.S. Appl. No. 12/227,966, dated Mar. 18, 2013.
Non-Final Office Action for Canadian Patent Application No. 2,610,811, dated May 28, 2013.
Non-Final Office Action for Chinese Patent Application No. 201110078482.9, dated May 27, 2013.
Non-Final Office Action for Canadian Patent Application No. 2,610,811, dated May 28, 2013, 3 pages.
Final Office Action for U.S. Appl. No. 13/194,736, dated Oct. 9, 2013.
Final Office Action for U.S. Appl. No. 13/194,736, dated Oct. 9, 2013, 9 pages.
Non-Final Office Action for Indian Patent Application No. 2191/MUMNP/2007, dated Nov. 5, 2013.
Non-Final Office Action for Chinese Patent Application No. 201110078482.9, dated Feb. 8, 2014.
First Exam Report for Indian Patent Application No. 2003/MUMNP/2007, dated Jan. 20, 2014.
Notice of Allowance for U.S. Appl. No. 13/194,736, dated Feb. 26, 2014.
Non-Final Office Action for Canadian Patent Application No. 2,610,811, dated Mar. 11, 2014.
Non-Final Office Action for U.S. Appl. No. 13/916,493, dated Jun. 9, 2014.

(56) References Cited

OTHER PUBLICATIONS

First Examination Report for Indian Patent Application No. 1958/MUMNP/2007, dated Aug. 21, 2014.
First Non-Final Office Action for Chinese Patent Application No. 201210299479.4, dated Aug. 19, 2014, 43 pages.
Non-Final Office Action for Chinese Patent Application No. 201210299535.4, dated Aug. 15, 2014.
First Office Action for Indian Patent Application No. 34/MUMNP/2008, dated Aug. 20, 2014.
Notice of Allowance for Japanese Patent Application No. 2013-081528, dated Sep. 24, 2014.
Non-Final Office Action for Canadian Patent Application No. 2,610,814, dated Sep. 29, 2014.
Partial European Search Report for European Patent Application No. 11153605.8, dated Sep. 15, 2014.
Non-Final Office Action for Chinese Patent Application No. 201110078482.9, dated Oct. 22, 2014.
Non-Final Office Action for U.S. Appl. No. 13/916,493, dated Oct. 24, 2014.
Notification for Reexamination for Chinese Patent Application No. 200680023934.0, dated Oct. 31, 2014.
Non-Final Office Action for Canadian Patent Application No. 2,608,329, dated Dec. 2, 2014.
Non-Final Office Action for Canadian Patent Application No. 2,610,811, dated Dec. 8, 2014.
Extended European Search Report for European Patent Application No. 11153605.8, dated Jan. 12, 2015.
Chapter 13 notes for course EE479 taught at Stanford University during Fall 1005, (2005), 44 pgs.
Chapter 14 Notes for Course EE479 taught at Stanford University during Fall 2005, 36 pgs.
International Search Report, International Application No. PCT/IB2006/000645; Mar. 26, 2007, 4 pgs.
International Search Report, International Application No. PCT/IB2006/000884, (dated Sep. 4, 2006), 5 pgs.
International Search Report, International Application No. PCT/IB2006/000499, (dated Jun. 9, 2006), 4 pgs.
International Search Report, International Application No. PCT/IB2006/000759, (Aug. 16, 2006), 6 pgs.
International Search Report, International Application No. PCT/IB2006000360,4 pgs.
International Search Report, International Application No. PCT/IB2006000836,5 pgs.
International Search Report, International Application No. PCT/IB2004003961, (dated Apr. 7, 2005), 4 pgs.
International Search Report and Written Opinion, PCT Application No. PCT/US2007/013393, (dated Jan. 4, 2008).
Invitation to Pay Additional Fees, International Application No. PCT/IB2006/000744,6 pgs.
ITU-T "Recommendation G.992.1", Asymetric digital subscriber line (ADSL) transceivers, Series G, as provided by International Searching Authority, Reference No. XP-002321806, (Jun. 1999), 226-239.
Physical Layer Management for Digital Subscriber Line (DSL), ITU—Telecommunication Standardization Sector; Geneva, Switzerland; XP-017401258; 45 pgs. (May 2003), 1-45.
Physical Layer Management for Digital Subscriber Line (DSL), ITU—Telecommunication Standardization Sector; Geneva, Switzerland; XP-017401258; 44 pgs. (May 2003), 46-89.
Written Opinion of the International Search Authority, International Application No. PCT/IB2004003961, (dated Apr. 7, 2005), 6 pgs.
Written Opinion of the International Search Authority, International Application No. PCT/IB2006000836, 8 pgs.
Written Opinion of the International Search Authority, International Application No. PCT/IB2006/000645. Mar. 26, 2007,9 pgs.
Written Opinion of the International Searching Authority, International Application No. PCT/IB2006/000759, 7 pgs.
Written Opinion of the International Searching Authority, International Application No. PCT/IB2006/00049, 6 pgs.
Written Opinion of the International Searching Authority, International Application No. PCT/IB2006000630, 6 pgs.
Written Opinon of the International Searching Authority, International Application No. PCT/IB2006/000884, 6 pgs.
Anonymous,Physical Layer Management for Digital Subscriber Line (DSL) Transceivers, International Telecommunication Union, Geneva, CH, May 2003, Ref XP017401258, 74 Pages.
Campello,Practical Bit Loading for DMT, ICC '99, 1999 IEEE International Conference on Communications; Conference Record; Vancouver, Canada. XP-000897971, (Jun. 6, 1999), 5 pgs.
Cendrillon, et al. "Improved Linear Crosstalk Precompensation for DSL," IEEE International Conference on Acoustics, Speech and Signal Processing (ICASSP), (Sep. 2004), 4 pgs.
Cendrillon, R, et al. "Improved Linear Crosstalk Precompensation for DSL," Acoustics, Speech and Signal Processing, 2004. Piscataway, NJ, US, vol. 4. (May 17, 2004), pp. 1053-1056.
Cendrillon, Raphael , et al. "Improved Linear Crosstalk Precompsensation for DSL," (May 2004).
Cendrillon, Raphael , et al. "Partial Crosstalk Cancellation Exploiting Line and Tone Selection in VDSL," (Sep. 2003).
Cendrillon, et al. "Partial Crosstalk Cancellation for Upstream VDSL," EURASIP Journal on Applied Signal Processing, (Oct. 2004), 16 pgs.
Cendrillon, et al. "Partial Crosstalk Precompensation for Downstream VDSL," Published by Elsevier North-Holland, Inc.; vol. 84 issue 11; ISSN:0165-1684, (Nov. 2004), 15 pgs.
Cendrillon, Raphael , et al. "Partial Crosstalk precompensation in downstream DSL," (Apr. 22, 2004).
Cendrillon, Raphael , et al. "The Linear Zero-Forcing Crosstalk Canceler is Near-optimal in DSL Channels,".
Cendrillon, et al. "The Linear Zero-Forcing Crosstalk Canceller is Near-optimal in DSL Channels," IEEE Global Communications Conference (Globalcom); Dallas; Texas. (Dec. 2004), 5 pgs.
Cheong, Minho , et al. "Computationally Efficient Cancellation of Partially-overlapped Crosstalk in Digital Subscriber Lines," Globalcom 2005; St. Louis, Missouri; Nov. 28-Dec. 2. (2005), 5 pgs.
Cioffi, John , et al. "Canonical packet transmission on the ISI channel with Gaussian noise," Global Telecommunications conference 1996, IEEE, New York, NY, vol. 2, (Nov. 18, 2005), pp. 1405-1410.
Cioffi, John M. et al. "Canonical Packet Transmission on the ISI Channel with Guassian Noise," Global Telecommunications Conference; London, UK. XP-010220148, (Nov. 18, 1996), 1405-1410.
Cioffi, John M. et al. "Dynamic Spectrum Management," A methodology for providing significantly higher broadband capacity to the users, Telektronikk, (Apr. 2004), 12 pgs.
Cioffi, John ,Dynamic Spectrum Management, Alcatel DSL Forum presentation; Paris, France. (Nov. 11, 20003).
Cioffi, John ,Dynamic Spectrum Management, Deutsche Telecom DSL presentation; Darmstadt, Germany. (Oct. 6, 2003).
Cioffi, John ,Dynamic Spectrum Management, IEEE Globalcom presentation; San Francisco, California. (Dec. 3, 2003).
Cioffi, John ,Dynamic Spectrum Management, Telecom Italia presentation; Turin, Italy. (Nov. 19, 2003).
Cioffi, John ,Dynamic Spectrum Management, Korea Telecom DSL presentation; Seoul, Korea, (Sep. 24, 2003).
Cioffi, John M., "Dynamic Spectrum Management" "DSL Advances," Chapter 11, Jun. 6, 2007, 53 pages.
Cioffi, John M.Dynamic Spectrum Management Report, Broadband World Forum; London, England. (Sep. 10, 2003).
Cioffi, John M.Dynamic Spectrum Management Report, Committee T1—Telecommunications Working Group NAI, San Francisco, California, (Feb. 21, 2005), 75 pgs.
Cioffi, John , et al. "Low-Latency Impulse Elimination," Committee T1, Working Group T1E1.4 (DSL Access); Atlanta GA, (Apr. 8, 2002).
Cioffi, John , et al. "MIMO Channel Measurement Test Plan," (Feb. 17, 2003).
Cioffi, John M., "Spectrum Management with Advancing DSLs," Dynamic Spectrum Management, ETSI TM6, Monterey, Nov. 27-Dec. 1, 2000, 9 pages.

(56) References Cited

OTHER PUBLICATIONS

Cioffi, John ,The Fast Adaptive Rotor's RLS Algorithm, IEEE Transactions on Acoustics, Speech and Signal Processing, New York, NY, US vol. 38, No. 4, (Apr. 1, 1990), pp. 631-653.
Cioffi, John , et al. "Vectored VDSL (99-559)," Dec. 5, 1999, XP007915701, 10 Pages.
Cuypers, et al. "Combined per tone equalization and receiver windowing in DSL receivers: WiPTEQ," Elsevier Science Publishers, Amsterdam, NL, vol. 85, No. 10, (Oct. 2005), pp. 1921-1942.
Cuypers, et al. "Combining Per Tone equalization and windowing in DMT receivers," IEEE International Conference on Acoustics, Speech and Signal Processing (ICASSP); Orlando, Florida. (Sep. 2002).
European Patent Office,Examination Report, European Application No. 07795837.9, (dated Apr. 1, 2009).
European Patent Office,First Office Action, European Application No. 04801294.2, (dated Jun. 27, 2008), Whole Document.
European Patent Office,First Office Action,European Application No. 06727480.3, (dated Jan. 30, 2009), 4 pgs.
Fang, Jeannie L.Modeling and Characterization of Copper Access Systems, (May 31, 2002).
Fischer, Robert F.Appendix E of "Precoding and Signal Shaping for Digital Transmission", Cited in book "Precoding and Signal Shaping for Digital Transmission" John Wiley & Sons, Inc. New York, 2002, ISBN: 978-0-471-22410-5, (Aug. 2002), 10 pgs.
Forouzan, et al. "Generalized Iterative Spectrum Balancing and Grouped Vectoring for Maximal Throughput of Digital Subscriber Lines," Globalcom 2005; St. Louis, Missouri. (Dec. 2, 2005), 5 pgs.
Franklin, Curt ,How DSL Works, HowStuffWorks.com <http://www.howstuffworks.com/dsl.htm> Jun. 30, 2009. (Aug. 7, 2000).
Ginis, George , et al. "A Multiuser precoding scheme achieving crosstalk cancellation with application to DSL systems," Signals, Systems, and Computers, 200. IEEE vol. 2. (Oct. 29, 2000), pp. 1627-1631.
Ginis, George , et al. "Alien Crosstalk Cancellation for Multipair Digital Subscriber Line Systems," vol. 2006 Article ID 16828, (2006).
Ginis, George , et al. "Blind adaptive MIMO decision feedback equalization using givens rotations," IEEE International Conference on Communications, New York, NY, US, vol. 1 of 5. (Apr. 28, 2002), pp. 59-63.
Ginis, George , et al. "Vectored Transmission for Digital Subscriber Line Systems," IEEE Journal, vol. 20 No. 5, Piscataway, NJ, US, XP-01143167, Jun. 1, 2002, 20 Pages.
Haller, B., et al. "Efficient Implementation of Rotation Operations for High Performance QRD-RLS Filtering," Application-Specific Systems, Architectures and Processors, 1997 Proceedings, IEEE Int'l Conference on Zurick, Switzerland Jul. 14-16, 1997, Los Alamitos, CA, USA, IEEE Computer Soc, US Jul. 14, 1997, pp. 162-174, XP010236687.
Harashima, et al. "Matched-transmission technique for channels with intersymbol interference," IEEE Transactions on Communication; vol. COM-20, No. 4, (Aug. 1972), 774-780.
Ilani, Ishai ,Crosstalk Cancellation for Multi-Line G.shdsl Systems, (Aug. 19, 2002).
Im, Gi-Hong , et al. "FEXT Cancellation for Multi-Carrier Transmission System," (Apr. 11, 2002).
Jiang, Yi , et al. "Joint Transceiver Design for MIMO Communications Using Geometric Mean Decomposition," IEEE Transactions on Signal Processing, vol. 53, No. 10, Oct. 2005,pp. 3791-3803.
Laroia, et al. "A Simple and Effective Precoding Scheme for Noise Whitening in Intersymbol Inference Channels," IEEE Trans. on Communication; vol. 41, (Oct. 1993), 1460-1463.
Lee, et al. "Binder MIMO Channels," submitted to IEEE Journal on Selected Areas in Communications, Reference No. XP-001143167, (Jun. 2002), 20 pgs.
Lightbody, G , et al. "Novel Mapping of a Linear QR Architecture," 0-7803-5041, Mar. 1999, 1999 IEEE,pp. 1933-1936.

Louveaux, et al. "Downstream VDSL Channel Tracking Using Limited Feedback for Crosstalk Precompensated Schemes," IEE ICASSP; Philidelphia, Pennsylvania, (Mar. 2005), 4 pgs.
Louveaux, J., et al. "Downstream VDSL channel tracking using limited feedback for crosstalk precompensated schemes," Acoustics, Speech and Signal Processing, 2005, (Mar. 18, 2005), pp. 337-340.
Magesacher, et al. "Exploiting the Common-Mode Signal in xDSL," Proc. 12th European Signal Processing Conference (EUSIPCO 2004), Vienna, Austria, Sep. 7-10, 2004. (Sep. 2004), 4 pgs.
Moulin, F., et al. "Discrete-multitone-based ADSL and VDSL systems performance analysis in an impulse noise environment," IEEE Proceedings: Sci Meas. Technol. vol. 150 No. 6, Reference No. XP-006024286, (Nov. 3, 2003), 273-78.
Nedev, N., et al. "Comparison between Interleaving and Multiple DMT Symbols per Respectfully Submits Codeword in ADSL Systems," Globalcom 2002—IEEE Global Telecommunications Conference; Taipei, Taiwan. Reference No. XP-010636152, (Nov. 17, 2002), 2265-69.
Otte, M , et al. "Complex CORDIC-like algorithms for linearly constrained MVDR beamforming," Broadband Communications, 2000. Piscataway, NJ, US. (Feb. 15, 2000), pp. 97-104.
Panigrahi, Saswat , et al. "Fine-Granularity Loading Schemes using Adaptive Reed-Solomon Coding for Discrete Multitone Modulation Systems," (2005).
Papandreou, Nikolaos ,Cooperative Bit-Loading and Fairness Bandwidth Allocation in ADSL Systems, (2003).
Papandreou, Nikolaos , et al. "Real Time FEXT Crosstalk Identification in ADSL Systems," IEEE, WISP 2003, Budapest, Hungary, Sep. 4-6, 2003. (Sep. 4, 2003), 6 Pages.
Papandreou, Nikos , et al. "Real-time FEXT Crosstalk Identification in ADSL Systems," 2003 International Symposium on Intelligent Signal Processing—WISP 2003, Budapest, Hungary. (Sep. 2003), 6 pgs.
Patent Cooperation Treaty,International Search Report, International Application No. PCT/IB2006/000482, (dated May 18, 2006), 4 pgs.
Patent Cooperation Treaty,International Search Report and Written Opinion, Application No. PCT/IB2006/000744.
Patent Cooperation Treaty,International Search Report and Written Opinion, PCT Application No. PCT/IB2006/000645, (dated Aug. 4, 2006).
Patent Cooperation Treaty,International Search Report and Written Opinion, PCT Application No. PCT/IB2006/000630, (dated Aug. 31, 2006).
Patent Cooperation Treaty,Written Opinion of the International Search Authority, International Application No. PCT/IB2005/00482, (dated Aug. 31, 2006), 7 pgs.
Paul, Clayton R.Analysis of Multiconductor Transmission Lines, John Wiley & Sons, Chapters 2 and 3, (1994), 46-186.
Proakis, John G.Digital Communications, third edition, 1995 McGraw-Hill Inc. (2005), 621-622.
Song, et al. "Dynamic Spectrum Management for Next-Generation DSL Systems," IEEE Communications Magazine, XP-001132769, (Oct. 2002), 101-109.
Song, Kee B. et al. "Dynamic Spectrum Management for Next-Generation DSL Systems," IEEE Communications Magazine vol. 40, No. 10; Reference No. XP-011092935, Oct. 1, 2002, 9 Pages.
Starr, et al. "DSL Advances," Chapters 3, 7, and 11; Prentice-Hall, (2003).
Starr, et al. "Information comment solicitation on ITU FEC INP submission for ADSL2," Committee T1, Working group T1E1.4 (DSL Access); Vancouver, BC, (Feb. 23, 2004).
Starr, et al. "Proposed revisions to G.992.4 and G.992.3&5 regarding impulse noise protection," Study group 15, ITU—Telecommunication Standardization Sector; San Francisco, California. (Mar. 8, 2004).
State Intellectual Property, Office of PR China ,Notification of the First Office Action, Chinese Patent Application No. 200480040960.5, (dated Mar. 27, 2009).
Tomlinson,New Automatic Equaliser Employing Modulo Arithmetic, Electr. Letters; vol. 7. (Mar. 1971), 138-139.

(56) References Cited

OTHER PUBLICATIONS

Veithen, D , et al. "A 70Mb/s Variable-Rate DMT-Based Modem for VDSL," 1999 IEEE International Solid-State Circuits Conference; ISSCC99/Session 14/Paper TP 14.6. Reference No. XP-002184687, (Feb. 15, 1999), 248-249.
Voyan Technology,Vectoring Techniques for Multi-Line 10MDSL Systems, (Aug. 2002).
Wei,Generalized Square and Hexagonal Constellations for Intersymbol-Interference Channels with Generalized Tomlinson-Harashima Precoders, IEEE Transactions on Communications, vol. 42, No. 9, (Sep. 1994), 9 pgs.
Yang, B., et al. "Systolic Implementation of a General Adaptive Array Processing Algorithm," 1988 IEEE, Apr. 11, 1988, pp. 2785-2788, XP010072845.
Ysebaert, Geert , et al. "Combined RLS-LMS Initialization for Per tone Equalizers in DMT-Receivers," IEEE Transactions on Signal Processing, vol. 51, No. 7, Jul. 2003,pp. 1916-1927.
Yu, et al. "Distributed Multiuser Power Control for Digital Subscriber Lines," IEEE Journal on Selected Areas in Communications; IEEE Service Center, Piscataway, US; vol. 20, No. 5; ISSN: 0733-8716. Reference No. XP-011065508, (Jun. 2002), 11 pgs.
First Office Action for European Patent Application No. 06727455.5, dated Mar. 3, 2009, 3 pages.

\* cited by examiner

| Time Marker 1 | Most recent showtime start of line x1 |
| Time Marker 2 | Most recent showtime start of line x2 + 2234 DMT superframes + 0 DMT frames |
| Time Marker 3 | Most recent initialization of line x3 + 0 DMT frames |
| Time Marker 4 | Most recent shutdown of line x4 |

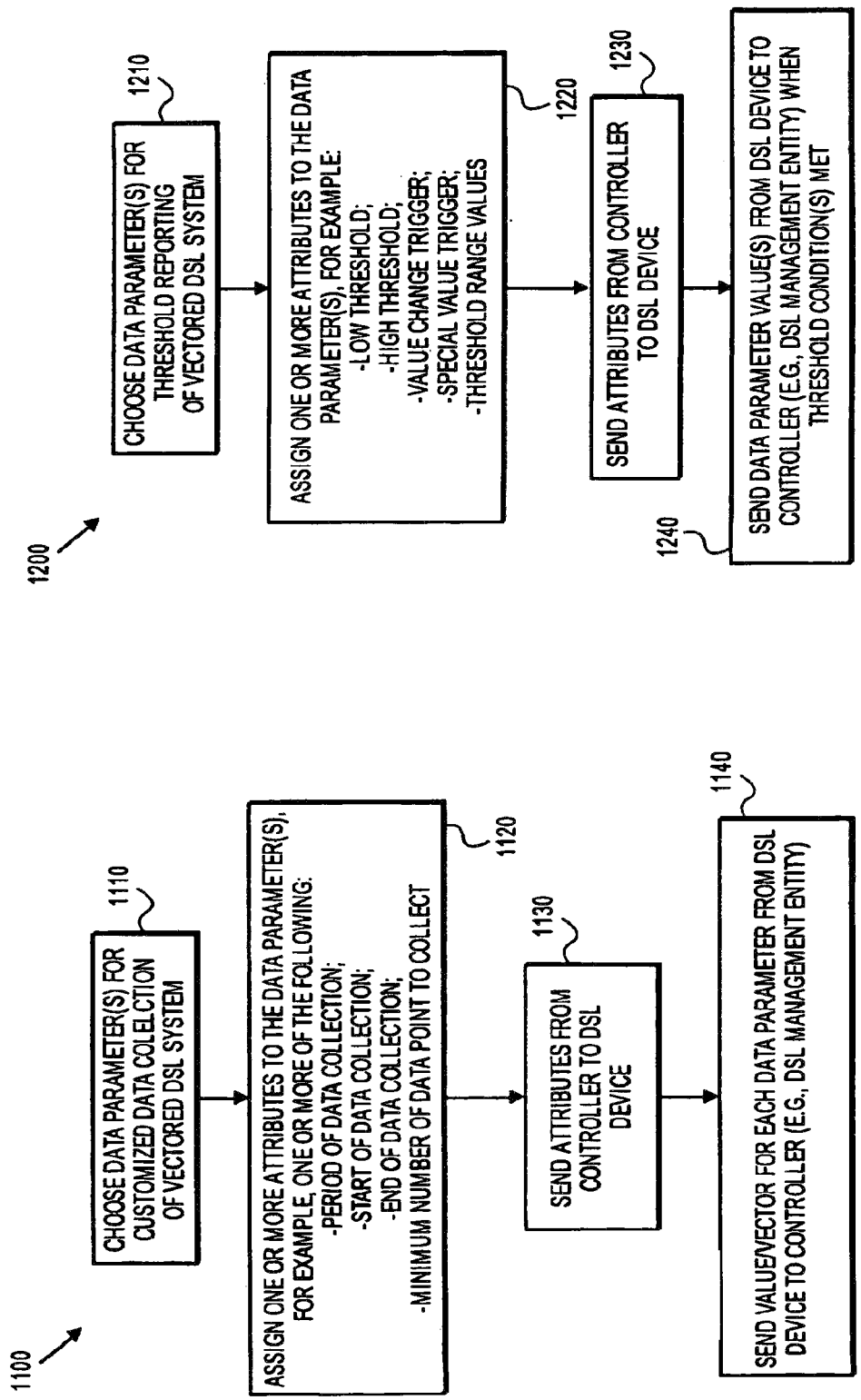

SYSTEMS, METHODS, AND APPARATUSES FOR IMPLEMENTING A DSL SYSTEM

CLAIM OF PRIORITY

This application is a continuation of U.S. patent application Ser. No. 13/916,493, filed Jun. 12, 2013, which is a continuation of U.S. patent application Ser. No. 12/227,966, filed Apr. 8, 2009, which is the U.S. National Phase of International Application No. PCT/US2007/013393, filed Jun. 6, 2007, and claims the benefit of U.S. Provisional Patent Application No. 60/811,355, entitled "Improved DSL system", filed Jun. 6, 2006, the disclosures of all of which are incorporated herein by reference in their entirety.

RELATED APPLICATIONS

This application is related to U.S. patent application Ser. No. 11/367,930, entitled "Nesting of Vectored DSLs", filed 3 Mar. 2006.

This application is related to U.S. patent application Ser. No. 11/267,623, entitled "Phantom Use in DSL Systems", filed 4 Nov. 2005.

This application is related to U.S. patent application Ser. No. 11/284,692, entitled "Tonal Rotors", filed 22 Nov. 2005.

This application is related to U.S. patent application Ser. No. 11/336,666, entitled "Tonal Precoding", filed 20 Jan. 2006.

This application is related to U.S. patent application Ser. No. 11/336,113, entitled "Adaptive GDFE", filed 20 Jan. 2006.

This application is related to U.S. patent application Ser. No. 11/345,215, entitled "DSL System Training", filed 1 Feb. 2006.

This application is related to U.S. patent application Ser. No. 11/342,028, entitled "Binder Identification", filed 28 Jan. 2006.

BACKGROUND OF THE INVENTION

Field of the Invention

This invention relates generally to methods, systems and apparatus for managing digital communication systems. More specifically, this invention relates to managing a DSL system or the like, especially distributed and/or bonded vectored DSL systems.

Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line. DSL systems can use vectoring technologies, where joint transmitter and/or joint receiver signal processing can be performed among multiple pairs to mitigate the effects of crosstalk interference, and thus to improve performance. DSL vectoring technologies typically have significantly higher complexity compared to non-vectored DSL technologies.

Systems, methods and techniques that improve operation in communication systems such as vectored DSL systems would represent a significant advancement in the art. In particular, systems, methods and techniques to reduce computational complexity, to meet quality of service requirements and to reduce operational expenses would represent a significant advancement in the art. Furthermore, improving the level and types of data available and controllable in such communication systems to achieve the afore-mentioned objectives would represent a considerable advancement in the field.

SUMMARY

An embodiment of the invention comprises at least one vectoring engine coupled to a cross-connect. The cross-connect can be coupled to a number of customer premises equipment (CPE) devices via a respective DSL loop. The embodiment further includes an interface to receive instructions for the cross-connect to couple each vectoring engine to a nonoverlapping subset of the CPE devices via the respective DSL loops. The interface also is to receive instructions for one of the vectoring engines to apply vectoring to the DSL loop via which to couple one of the CPE devices to the cross-connect.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 11 illustrates a method for adaptive data collection in a DSL loop according to one or more embodiments of the invention.

FIG. 12 illustrates a method for adaptive data collection in a DSL loop according to one or more embodiments of the invention.

DETAILED DESCRIPTION OF THE INVENTION

Figure 1:
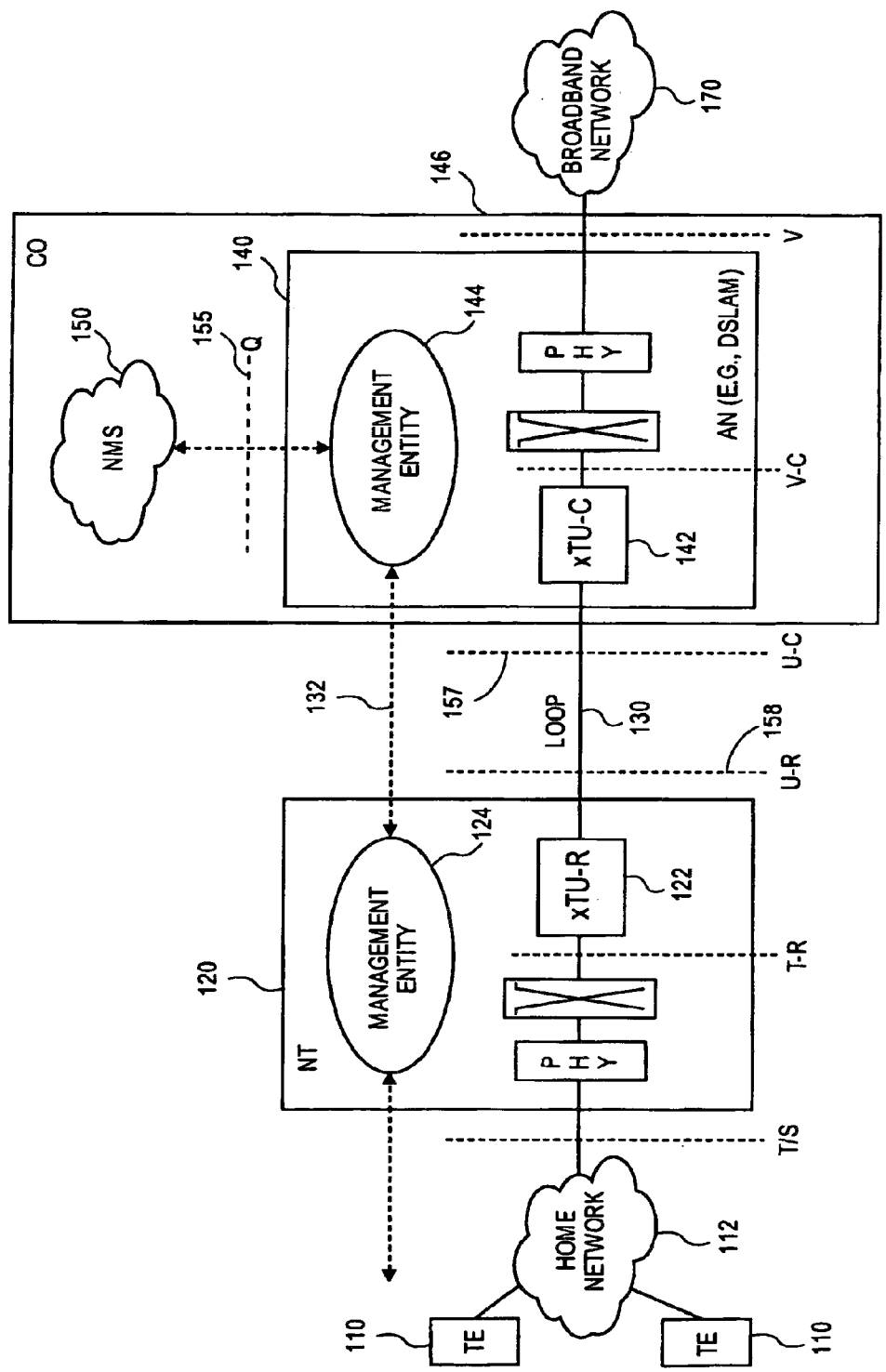
FIG. 1 shows the reference model diagram for a DSL system from the ITU-T G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

The methods, systems and apparatus described in this invention are of particular interest for vectored DSL systems, in which joint transmitter and/or joint receiver signal processing operations can be performed on signals of multiple DSL lines. Moreover, the usual complexity of vectored DSL transceivers can be reduced using embodiments of the invention by transferring some of the vectoring computational burden to a system external to the vectored DSL transceivers, or by controlling the vectored DSL systems to achieve the best trade-offs between performance and complexity. DSL systems can use vectoring technologies, where joint transmitter or joint receiver signal processing is performed among multiple pairs to mitigate the effects of crosstalk interference, and thus to improve performance. DSL vectoring technologies have significantly higher complexity compared to non-vectored DSL technologies. For this reason, DSL vectored systems would benefit from interfaces that allow improved data reporting and parameter controlling. Such interfaces can help better manage the trade-offs between complexity and performance, such that the advantages of vectoring can be realized at the minimum cost.

The term "vectoring" and the like, as used herein, may mean "distributed vectoring" in which signals from multiple users' modems are jointly processed, "bonded vectoring" in which signals from multiple loops of a single user are jointly processed, hybrids of distributed and bonded vectoring and other modes of vectoring known to those skilled in the art. Hybrid methods for distributed and bonded vectoring are described in the above referenced U.S. patent application Ser. No. 11/367,930.

As described in more detail below, a controller, such as a DSL management entity, DSL optimizer, spectrum management center (SMC), dynamic spectrum management center (DSM Center, or simply, DSMC), a "smart" modem, control software/hardware and/or computer system can be used to collect and analyze the operational data and/or performance parameter values as described in connection with the various embodiments of the invention. The controller and/or other components can be a computer-implemented device or combination of devices. In some embodiments, the controller is in a location remote from the modems. In other cases, the controller may be collocated with one of or both of the modems as equipment directly connected to a modem, Digital Subscriber Line Access Multiplexer (DSLAM) or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Figure 2:
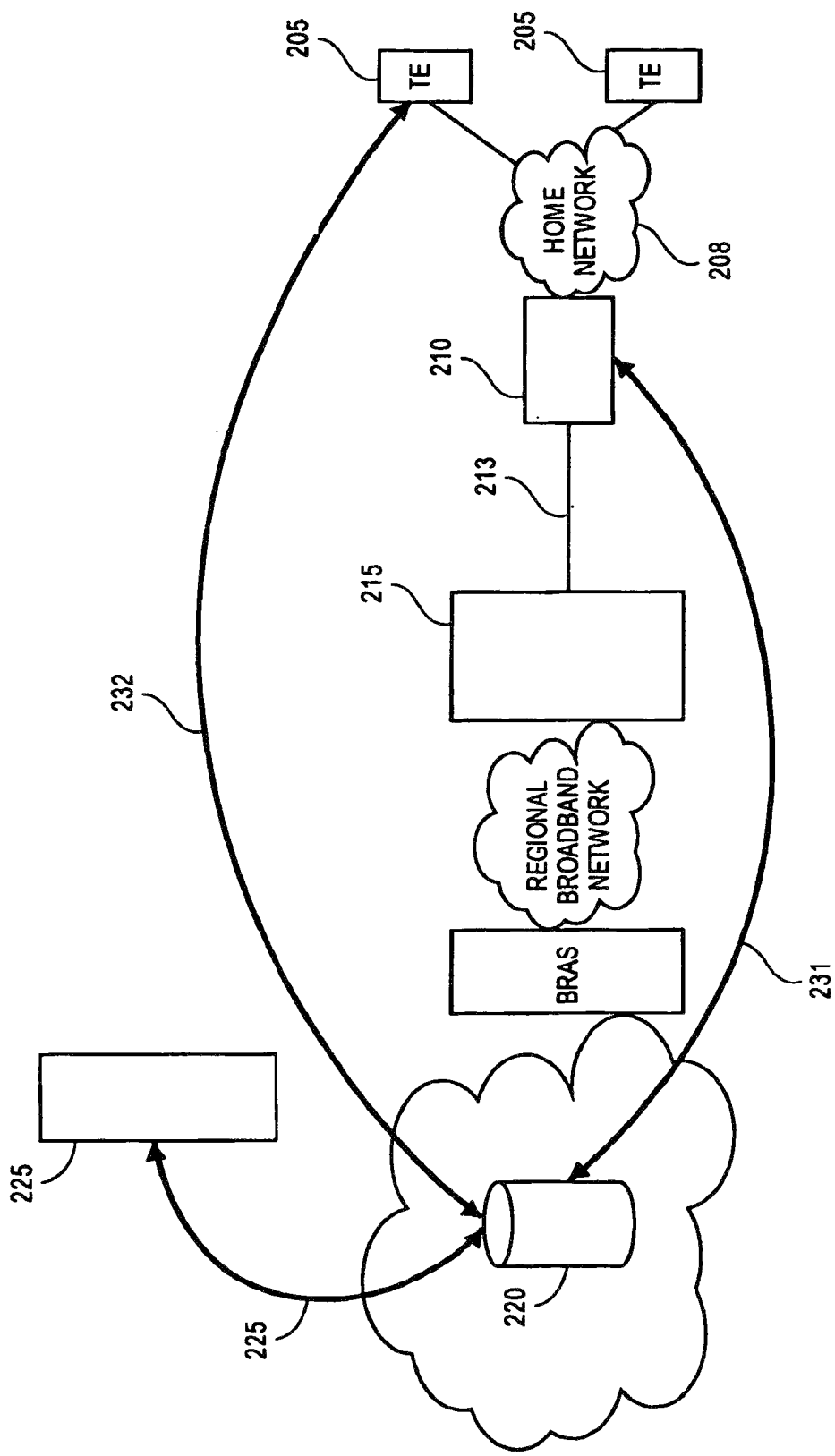
FIG. 2 shows a positioning diagram from the DSL Forum TR-069 technical report.

Embodiments of the invention can be used in vectored DSL systems, as described herein and/or as suggested to those skilled in the art by the disclosure herein. Two well known systems in which various embodiments of the invention can be used are shown in FIGS. 1 and 2. Because these systems are well known and understood in the art, no detailed explanation of FIGS. 1 and 2 is provided, except in connection with the explanation of the invention.

Figure 1A:
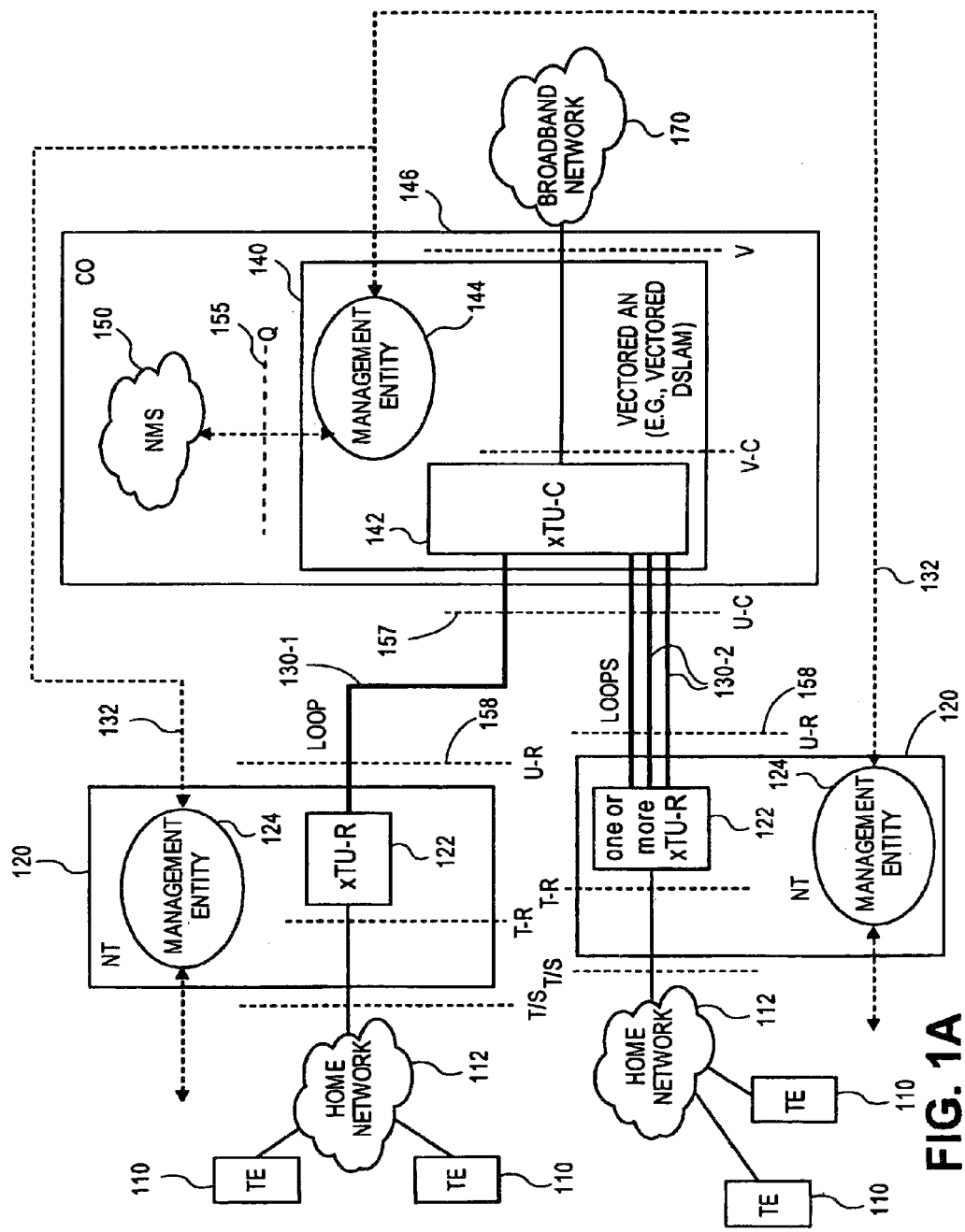
FIG. 1A illustrates an extension of the diagram of FIG. 1 for the case of DSL vectoring.

FIG. 1A is an extension of the reference model diagram from the ITU-T G.997.1 standard for the case of vectoring, showing bonded loops 130-2 and a single loop 130-1 that can be combined with one or more loops, including loops 130-2, using distributed vectoring. The Customer Premises Equipment (CPE)-side modem (or other DSL device) is referred to as an xDSL Transmission Unit-Remote (xTU-R) to cover ADSL, VDSL and/or other types of DSL service. Similarly, the upstream end device(s) is/are referred to as xDSL Transmission Unit-Central (xTU-C) for the same reasons.

Figure 2A:
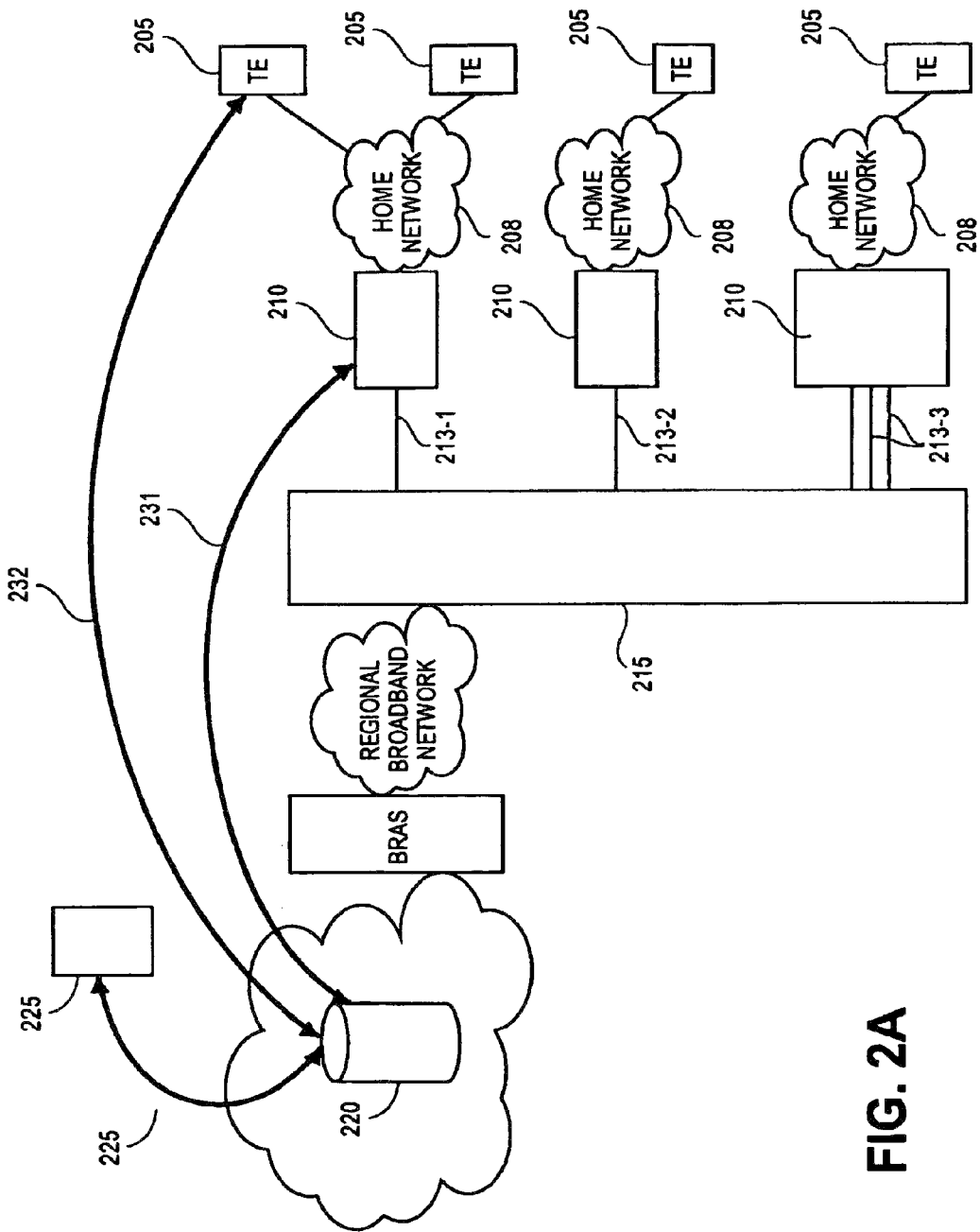
FIG. 2A illustrates an extension of the diagram of FIG. 2 for the case of DSL vectoring.

Further, FIG. 2A is an extension of the positioning diagram from the DSL Forum TR-069 technical report, also for the case of vectoring, where again multiple users' loops 213-1, 231-2 and/or 213-3 can be combined using distributed vectoring, and/or a single user's loops 213-3 can be combined using bonded vectoring.

FIG. 1A shows the reference model for a vectored system extending the single pair system of the G.997.1 standard (sometimes also called "G.ploam"), in which embodiments of the invention can be implemented. This model can be applied to all ADSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1

(G.993.1) and the G.993.2 VDSL2 standards, as well as the G.991.1 and G.991.2 SHDSL standards, all with and without bonding.

The G.997.1 standard specifies the physical-layer management for DSL transmission systems based on the clear embedded operation channel (EOC) defined in G.997.1 and use of indicator bits and EOC messages defined in G.99× standards. Moreover, G.997.1 specifies network-management-elements content for configuration, fault and performance management. In performing these functions, the system utilizes a variety of operational data that are available at and can be collected from a Vectored Access Node (AN) or from a network termination (NT). The ADSL Forum's TR-069 report also lists a Management Information Base (MIB) and how it might be accessed.

In FIGS. 1 and 1A, customers' terminal equipment 110 is coupled to a home network 112, which in turn is coupled to a network termination unit (NT) 120. In the case of a DSL system, NT 120 includes an xTU-R 122 (for example, a modem, also referred to as a transceiver in some cases, defined by one of the DSL standards) or any other suitable network termination modem, transceiver or other communication unit. Each modem can be identified, for example, by manufacturer and model number. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via Transaction Language 1 (TL1) commands, TL1 being a long-established command language used to program responses and commands between telecommunication network elements.

Each xTU-R in a system is coupled to an xTU-C in a Central Office (CO) or other central location. In FIG. 1, xTU-C 142 is located at a Vectored Access Node (AN) 140 in a CO 146. Vectored AN 140 may be a Vectored DSL system component, such as a Vectored DSLAM or the like, as will be appreciated by those skilled in the art. An ME 144 likewise maintains an MIB of performance data pertaining to xTU-C 142. The Vectored AN 140 may be coupled to a broadband network 170 or other network, as will be appreciated by those skilled in the art. xTU-R 122 and xTU-C 142 are coupled together by a loop 130, which in the case of DSL typically is a telephone twisted pair that also carries other communication services.

Several of the interfaces shown in FIGS. 1 and 1A can be used for determining and collecting performance data. The Q-interface 155 provides the interface between the Network Management System (NMS) 150 of the operator and ME 144 in AN 140. All the parameters specified in the G.997.1 standard apply at the Q-interface 155. The near-end parameters supported in ME 144 are derived from xTU-C 142, while the far-end parameters from xTU-R 122 can be derived by either of two interfaces over the U-interface. Indicator bits and EOC messages, which are sent using one of the embedded channels 132 and are provided at the Physical Medium Dependent (PMD) layer, can be used to generate the required xTU-R 122 parameters in ME 144. Channels 132 are part of the management interface of G.997.1. Alternately, the OAM (Operations, Administrations and Management) channel and a suitable protocol can be used to retrieve the parameters from xTU-R 122 when requested by ME 144. Similarly, the far-end parameters from xTU-C 142 can be derived by either of two interfaces over the U-interface. Indicator bits and EOC messages, which are provided at the PMD layer, can be used to generate the required xTU-C 142 parameters in ME 124 of NT 120. Alternately, the OAM channel and a suitable protocol can be used to retrieve the parameters from xTU-C 142 when requested by ME 124.

At the U-interface (which is essentially one or more loops 130), there are two management interfaces, one at xTU-C 142 (the U-C interface 157) and one at xTU-R 122 (the U-R interface 158). Interface 157 provides xTU-C near-end parameters for xTU-R 122 to retrieve over the U-interface 130. Similarly, interface 158 provides xTU-R near-end parameters for xTU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, xTU-C and xTU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998, which is well known to those skilled in the art. Also, as noted above, DSL Forum Technical Report TR-069, entitled "CPE WAN Management Protocol" dated May 2004 is well known to those skilled in the art. Finally, DSL Forum Technical Report TR-064, entitled "LAN-Side DSL CPE Configuration Specification" dated May 2004 is well known to those skilled in the art. These documents address different situations for CPE side management. More information about VDSL can be found in the ITU standard G.993.1 (sometimes called "VDSL1") and the ITU standard G.993.2 (sometimes called "VDSL2"), as well as several DSL Forum working texts in progress, all of which are known to those skilled in the art. Additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) and Technical Report TR-106 entitled "Data Model Template for TR-069 Enabled Devices," as well as in the revisions of ITU standard G.997.1 for VDSL2 MIB elements, or in the ATIS Dynamic Spectrum Management Report, ATIS-0600007. Further information may be found in DSL Forum draft working texts WT-105 entitled "Testing & Interoperability: ADSL2/ADSL2plus Functionality Test Plan" and WT-115 entitled "Testing & Interoperability: VDSL2 Functionality Test Plan" and WT-121 entitled "DSL Home Technical: TR-069 Implementation Guidelines."

As will be appreciated by those skilled in the art, at least some of the operational data and/or parameters described in these documents can be used in connection with embodiments of the invention. Moreover, at least some of the system descriptions are likewise applicable to embodiments of the invention. Various types of operational data and/or information available from a DSL NMS can be found therein; others are known to those skilled in the art.

FIGS. 2 and 2A include one or more CPE side devices 205 that may be coupled to a CPE modem or other DSL device 210 by a LAN 208. Modem 210 is coupled to a Vectored DSLAM or other upstream DSL device 215 by one or more loops 213. Vectored DSLAM 215 can be coupled to a regional or other broadband network that includes a broadband remote access server (BRAS) or the like, as will be appreciated by those skilled in the art. An auto-configuration server (ACS) 220 can be part of and/or coupled to a network such as the Internet or the like. ACS 220 is coupled to Vectored DSLAM 215 through a regional broadband network. ACS 220 may have a "northbound" or upstream interface 222 to a controller 225 (for example, a DSL management entity, a DSL optimizer, a DSM Center, spectrum management center (SMC), control software (which also may be inside ACS rather than coupled to it externally), etc.) and one or more "southbound" or downstream interfaces. In FIGS. 2 and 2A, southbound interfaces 231, 232 couple the ACS 220 to the CPE DSL device 210 and a CPE side device 205. Other interfaces according to embodiments of the invention are possible, as discussed in more detail below.

Figure 3:
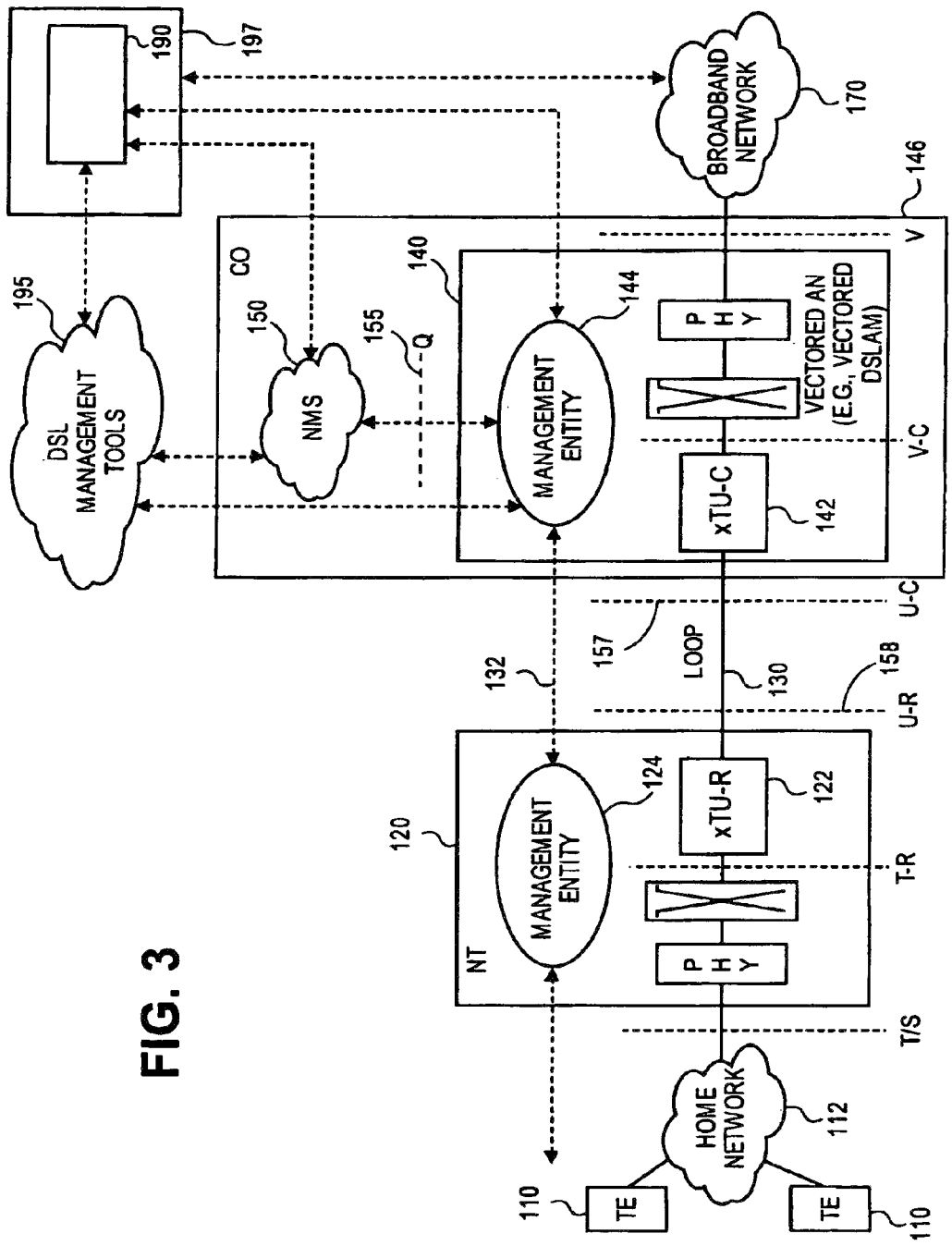
FIGS. 3 and 3A illustrate augmented DSL systems using the reference models of FIGS. 1 and 1A as bases; each illustrates DSL management tools and a DSL management entity coupled to the DSL system.
Figure 3A:
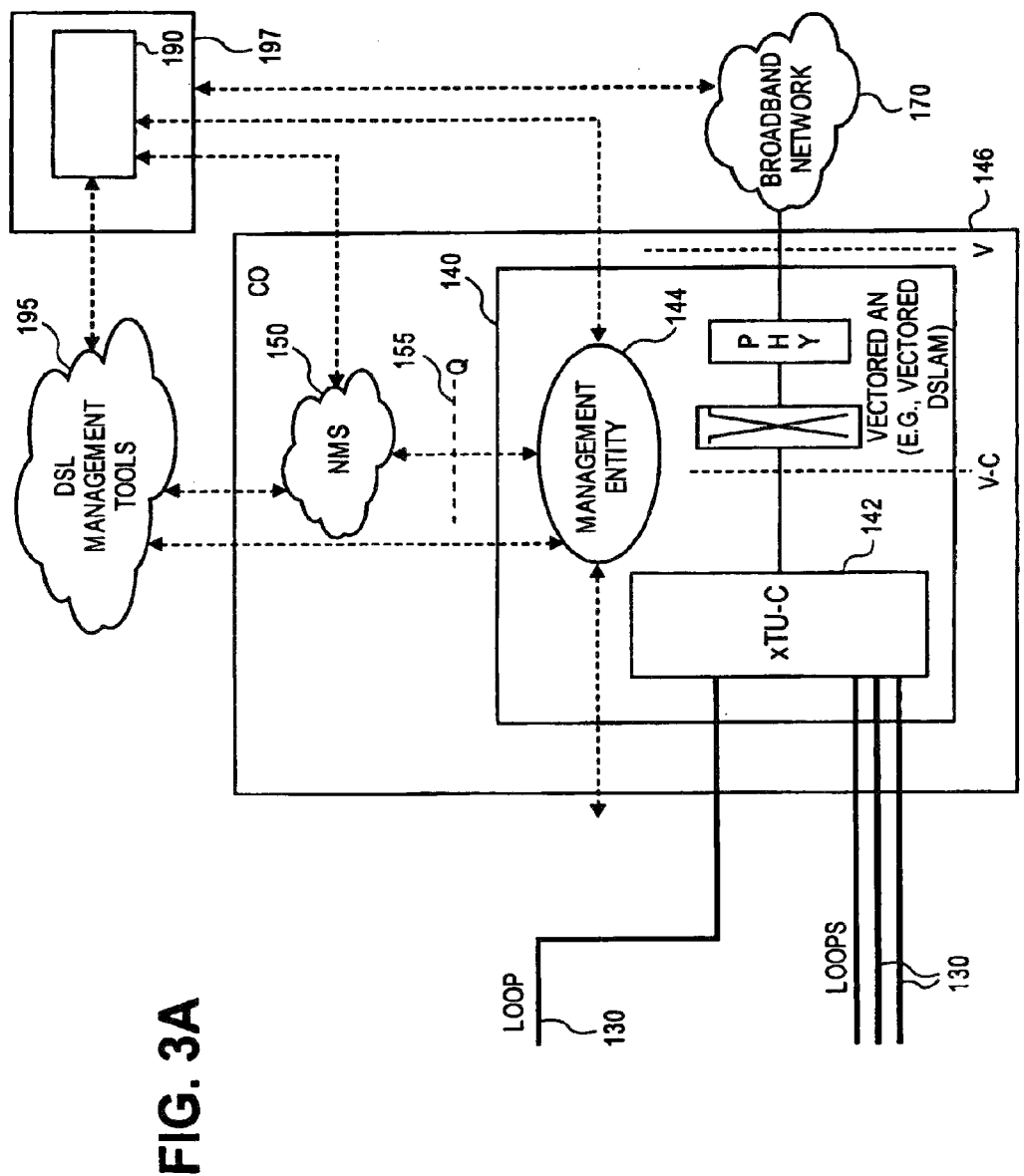

FIGS. 3 and 3A are augmented DSL systems using the reference models of FIGS. 1 and 1A as bases. Unlike the systems of FIGS. 1 and 1A, the augmented systems of FIGS. 3 and 3A each have DSL management tools and a DSL management entity coupled to the Vectored DSL system. As seen in FIGS. 3 and 3A, a DSL management entity 190 (for example, housed in a server 197 coupled to the broadband network 170) permits communication with various system components, such as one or more DSL devices 122, 142; one or more MEs 124, 144 in the system; the NMS 150; and/or the DSL management tools 195. The DSL management tools 195 are available to various system components as well. In FIGS. 3 and 3A, DSL management tools 195 are coupled to the NMS 150, ME 144 and the DSL management entity 190.

Figure 4:
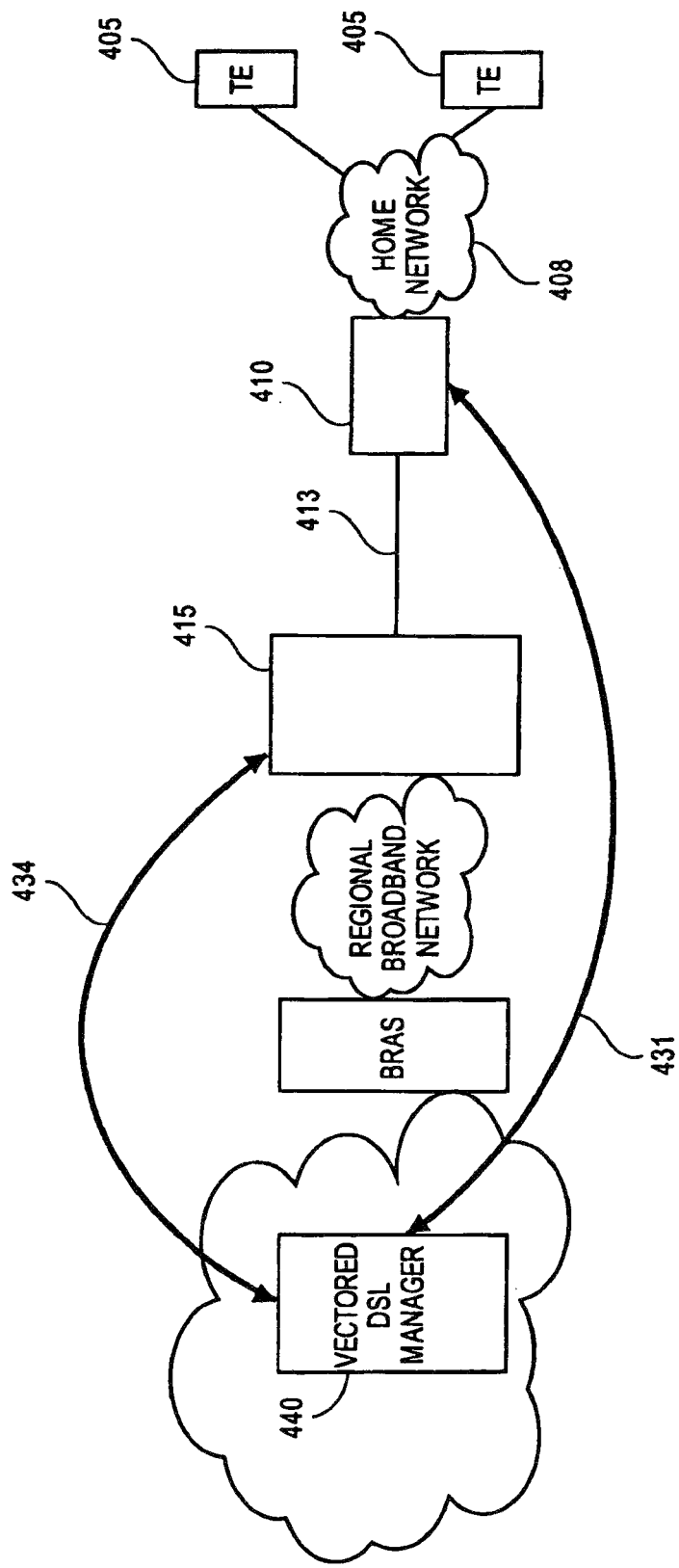
FIGS. 4 and 4A illustrate augmented DSL systems using the positioning diagram from the DSL Forum TR-069 report as a basis, and include one or more CPE side devices that may be coupled to a CPE modem or other DSL device by a LAN.
Figure 4A:
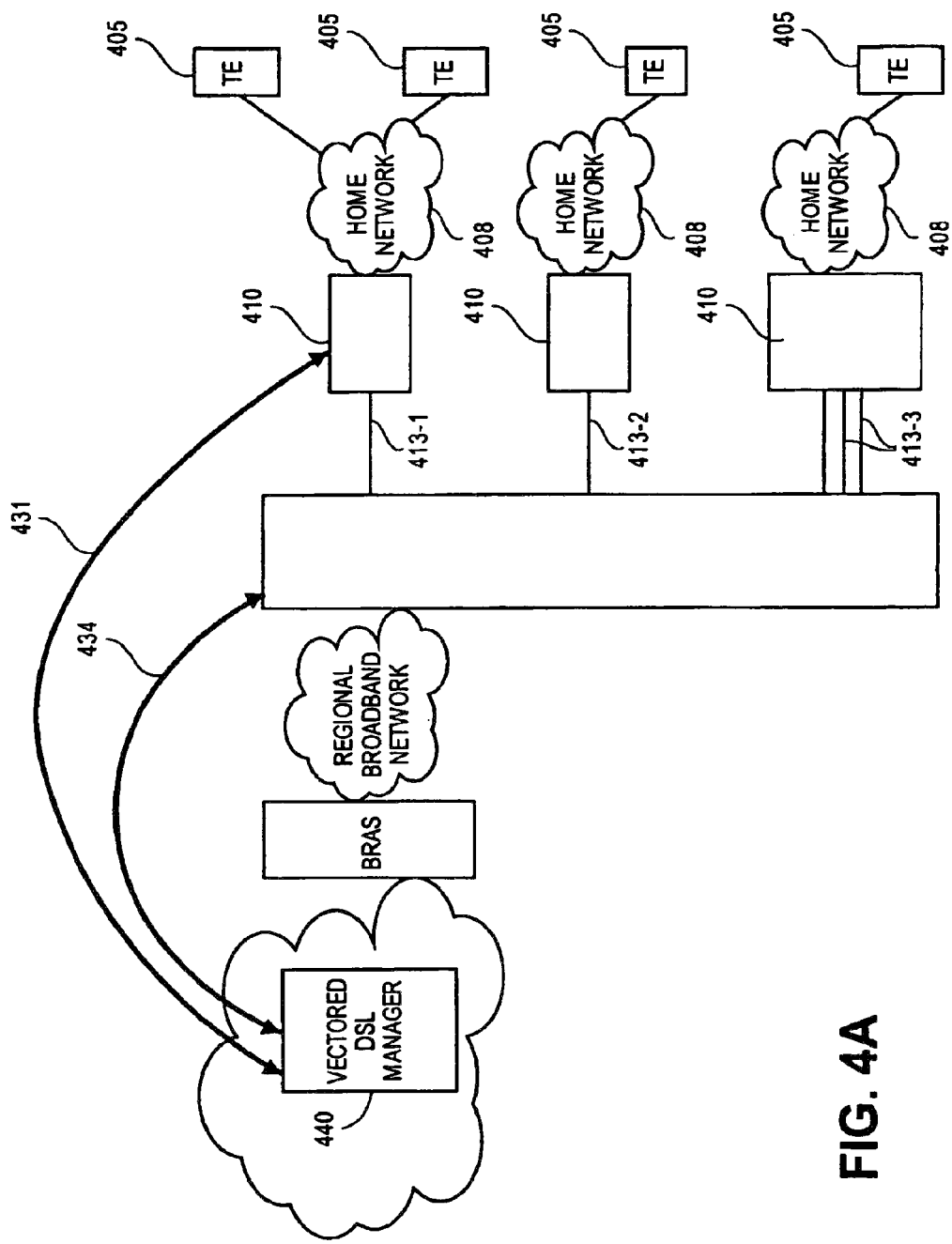

FIGS. 4 and 4A, similar to FIGS. 2 and 2A, are augmented DSL systems using the positioning diagram from the TR-069 report as a basis. Each system in FIGS. 4 and 4A includes one or more CPE side devices 405 that may be coupled to a CPE modem or other DSL device 410 by a LAN 408. Modem 410 is coupled to a Vectored DSLAM or other upstream DSL device 415 by one or more loops 413. A Vectored DSL Manager 440 (for example, a controller, DSL management entity, a DSL optimizer, a DSM Center, spectrum management center (SMC), control software, etc.) is coupled to the Vectored DSLAM 415, for example through the Regional Broadband Network. The Vectored DSL Manager 440 may include as its components an ACS and a Service Configuration Manager, and may have one or more "southbound" or downstream interfaces. In FIG. 4, however, the southbound interfaces 431, 434 couple the Vectored DSL Manager 440 to the CPE DSL device 410 and the Vectored DSLAM 415. Other interfaces according to embodiments of the invention are possible, as discussed in more detail below.

Figure 5:
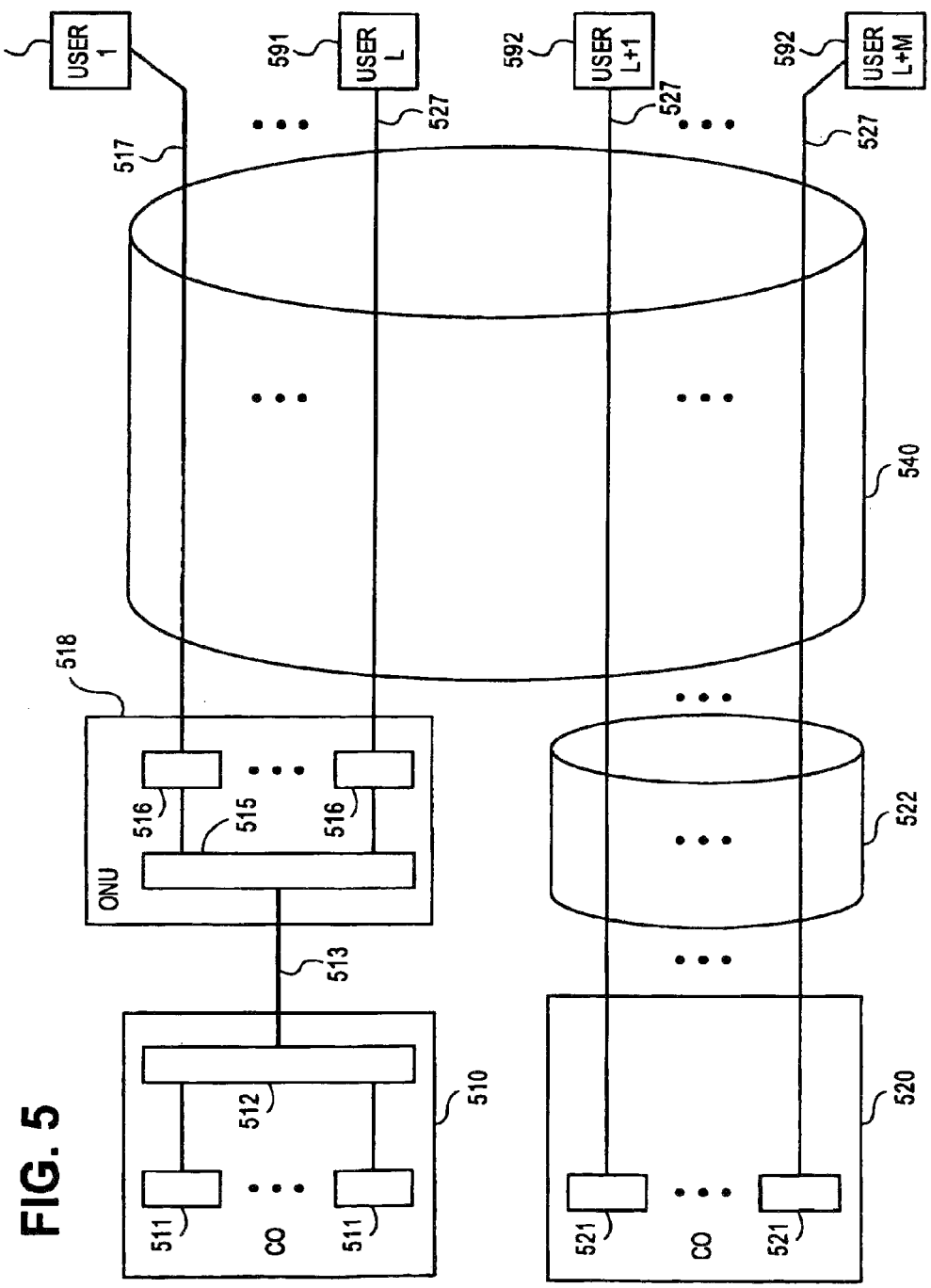
FIG. 5 illustrates a general schematic diagram of a DSL system, showing the layout and operation of the system.

FIG. 5 illustrates a general schematic diagram of a DSL system, showing the layout and operation of the system. Such a layout and any other layouts wherein users communicate via CPE modems with DSLAMs and the like over actual copper plant will be referred to as a "field" system herein (as opposed to "lab" systems in which artificial topological configurations are used). In a typical topology of a DSL plant, in which a number of transceiver pairs are operating and/or available, part of each subscriber loop is collocated with the loops of other users within a multi-pair binder (or bundle). Although not shown in FIG. 5, the loop takes the form of a drop wire and exits the bundle at a point very close to the Customer Premises Equipment (CPE), at what is called a wiring pedestal (also known as a distribution terminal). Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

A generic, exemplary DSL deployment scenario is shown in FIG. 5. All the subscriber loops of a total of (L+M) users 591, 592 pass through at least one common binder 540. Each user is connected to a Central Office (CO) 510, 520 through a dedicated line. However, each subscriber loop may be passing through different environments and mediums. In FIG. 5, L customers or users 591 are connected to CO 510 using a combination of optical fiber 513 and twisted copper pairs 517, which is commonly referred to as Fiber to the Cabinet (FTTCab) or Fiber to the Curb. Signals from transceivers 511 in CO 510 have their signals converted by optical line terminal 512 in CO 510 and optical network terminal 515 in optical network unit (ONU) 518. Modems 516 in ONU 518 act as transceivers for signals between the ONU 518 and users 591. A subset of modems 516 may comprise a vectored group. Alternately, more than one non-overlapping subsets of modems 516 may comprise corresponding vectored groups. Similarly, a subset of modems 521 may comprise a vectored group. Alternately, more than one non-overlapping subsets of modems 521 may comprise corresponding vectored groups.

The loops 527 of the remaining M users 592 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems for FTTEx loops. Moreover, FTTCab is expected to become an increasingly popular topology in the future. This type of topology can lead to substantial crosstalk interference and may mean that the lines of the various users have different data carrying and performance capabilities caused by the specific environment in which they operate. The topology can be such that fiber-fed "cabinet" lines and exchange lines can be mixed in the same binder.

As can be seen in FIG. 5, the lines from CO 520 to users 592 share binder 522, which is not used by the lines between CO 510 and users 591. Moreover, another binder 540 is common to all the lines to/from CO 510 and CO 520 and their respective users 591, 592.

Figure 6A:
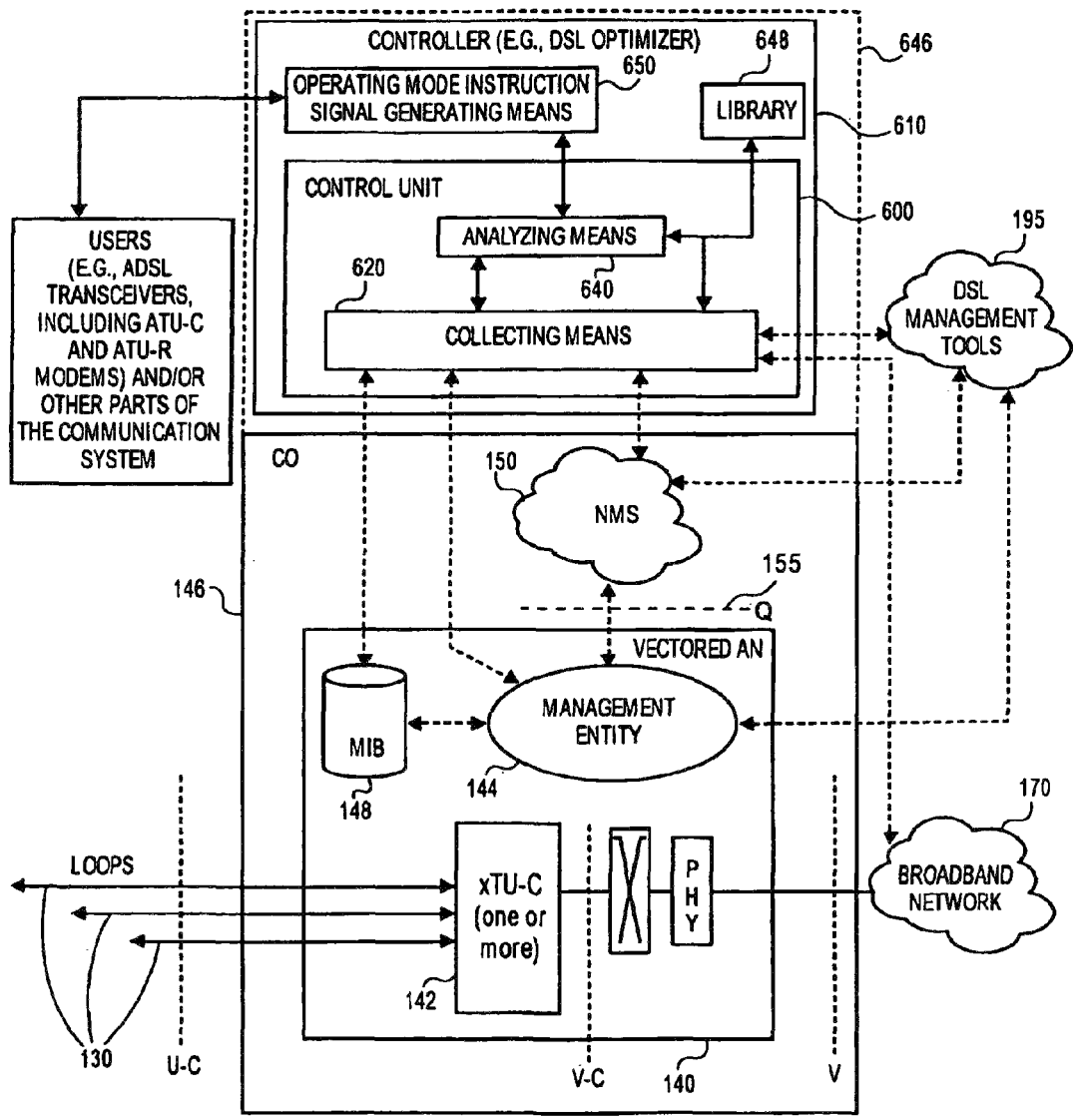
FIG. 6A illustrates a DSL optimizer coupled in communication with a DSL system in accordance with an embodiment of the invention.

According to one embodiment of the invention shown in FIG. 6A, a control unit 600 may be part of an independent entity coupled to a DSL system, such as a controller 610 (for example, a DSL management entity, DSL optimizer, DSM server, DSM Center, or spectrum management center) assisting users and/or one or more system operators or providers in optimizing their use of the system. (A DSL optimizer may also be referred to as a dynamic spectrum manager, Dynamic Spectrum Management Center, DSM Center, Spectrum Management Center (SMC) and include and/or have access to DSL management tools.) In some embodiments, the controller 610 may be an Independent Local Exchange Carrier (ILEC) or Competitive Local Exchange Carrier (CLEC) operating a number of DSL lines from a CO or other location. As seen from the dashed line 646 in FIG. 6A, the controller 610 may be in the CO 146 or may be external and independent of CO 146 and any company operating within the system. Moreover, controller 610 may be coupled to and/or controlling DSL and/or other communication lines in multiple COs.

The control unit 600 includes collecting means 620 and analyzing means 640. As seen in FIG. 6A, the collecting means 620 may be coupled to NMS 150, ME 144 at Vectored AN 140, the MIB 148 maintained by ME 144 and/or the DSL Management Tools 195 (which also may be coupled to or otherwise in communication with ME 144). Data also may be collected through the broadband network 170 (for example, via the TCP/IP protocol or other protocol or means outside the normal internal data communication within a given DSL system). One or more of these connections allows the control unit to collect operational data from the system, including customized data collection and collection of data parameters in accordance with an embodiment of the invention. Data may be collected once or over time. In some cases, the collecting means 620 will collect on a periodic basis, though it also can collect data on-demand or any other non-periodic basis (for example, when a DSLAM or other component sends data to the control unit), thus allowing the control unit 600 to update its information, rules, sub-rules, etc., if desired. Data collected by means 620 is provided to the analyzing means 640 for analysis and any decision regarding further operation of the DSL system and/or any of its components.

In the exemplary system of FIG. 6A, the analyzing means 640 is coupled to a modem and/or system operating signal generating means 650 in the controller 610. This signal generator 650 is configured to generate and send instruction signals to modems and/or other components of the communication system (for example, DSL transceivers and/or other equipment, components, etc. in the system). These instructions may include instructions regarding acceptable data rates, transmit power levels, coding and latency requirements, etc. The instructions also may include control parameters and time-related information concerning timestamped parameters used in the instructions. The instructions may be generated after the controller 610 determines the need and/or desirability of various parameters and processes in the communication system, including embodiments of the invention. In some cases, for example, the instruction signals can assist in improving performance for one or more customers and/or operators using the system by allowing the controller 610 to have better and/or more control over the operation of the communication system.

Embodiments of the invention can utilize a database, library or other collection of data pertaining to the data collected, decisions made regarding relevant parameters, past decisions regarding such parameters, etc. This collection of reference data may be stored, for example, as a library 648 in the controller 610 of FIG. 6A and used by the analyzing means 640 and/or collecting means 620.

In some embodiments of the invention, the control unit 600 may be implemented in one or more computers such as PCs, workstations or the like. The collecting means 620, analyzing means 640 and signal generator 650 may be one or more software modules, hardware modules/devices 1700 (for example, computer, processor, IC, computer module, etc. of the type generally known) or a combination of both, as will be appreciated by those skilled in the art. When working with a large numbers of modems, databases may be introduced and used to manage the volume of data collected.

Figure 6B:
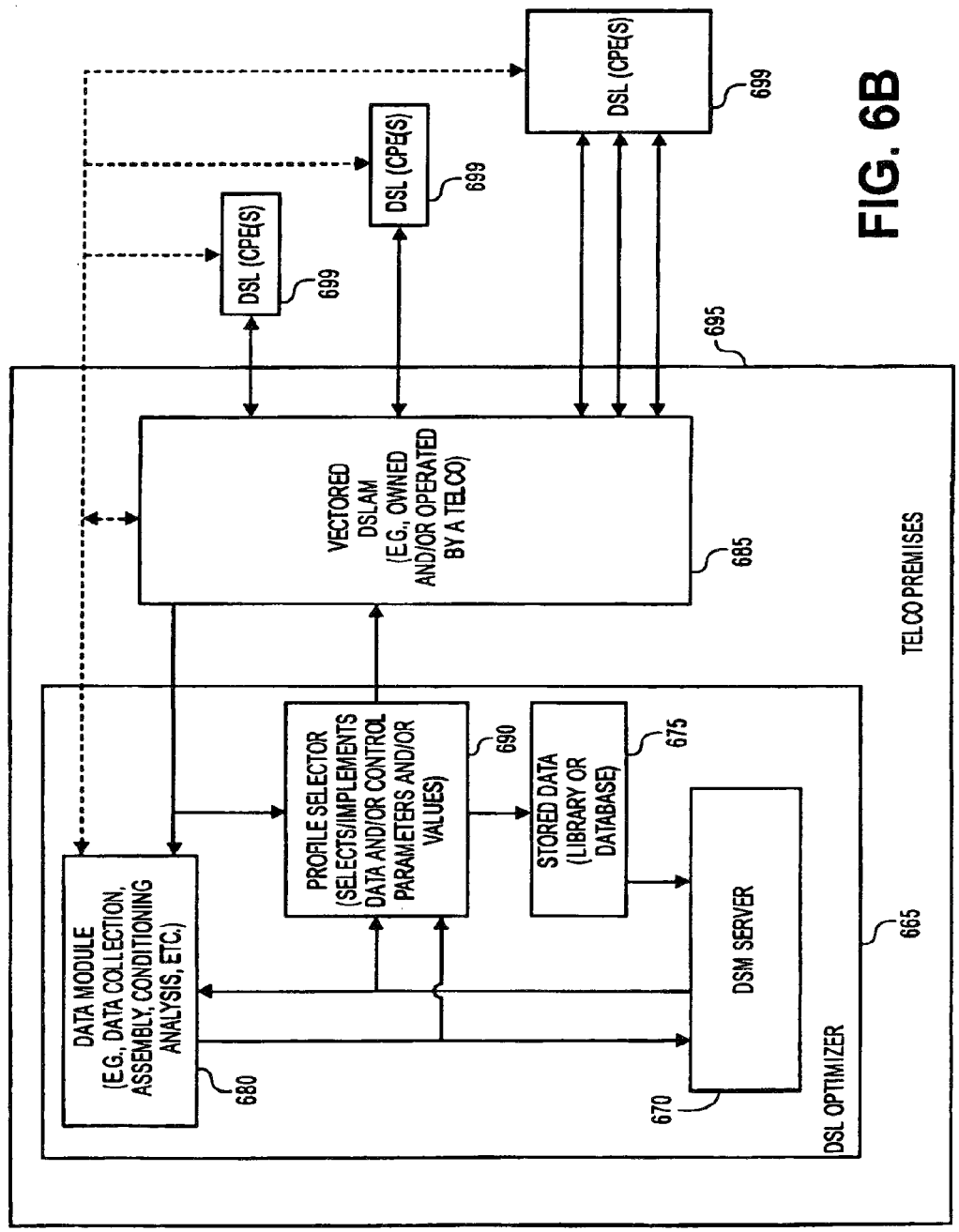
FIG. 6B illustrates a DSL optimizer that operates in connection with a Vectored DSLAM in accordance with an embodiment of the invention.

Another embodiment of the invention is shown in FIG. 6B. A DSL optimizer 665 operates on and/or in connection with a Vectored DSLAM 685 or other DSL system component, either or both of which may be on the premises 695 of a telecommunication company (a "telco"). The DSL optimizer 665 includes a data collection and analysis module 680, which can collect, assemble, condition, manipulate and supply operational data for and to the DSL optimizer 665 (where, as with any embodiments of the invention, the operational data can include performance data as well). Module 680 can be implemented in one or more computers such as PCs or the like. Data from module 680 is supplied to a DSM server module 670 for analysis. Information also may be available from a library or database 675 that may be related or unrelated to the telco. A profile selector 690 may be used to select and implement profiles such as data and/or control parameters and/or values. Profiles and any other instructions may be selected under the control of the DSM server 670 or by any other suitable manner, as will be appreciated by those skilled in the art. Profiles selected by selector 690 are implemented in the Vectored DSLAM 685 and/or any other appropriate DSL system component equipment. Such equipment may be coupled to DSL equipment such as customer premises equipment 699, which may provide signals for distributed vectoring and/or bonded vectoring, as seen in FIG. 6B. The system of FIG. 6B can operate in ways analogous to the system of FIG. 6A, as will be appreciated by those skilled in the art, though differences are achievable while still implementing embodiments of the invention.

Embodiments of the invention, used in connection with DSL Management interfaces, can significantly improve the management capabilities of a DSL network when vectored DSL systems are deployed and/or improve testing relating to DSL equipment and services. They also aim to reduce the computational burden that is imposed on the DSL transceivers located at the DSLAM or the CPE by enabling the DSMC to perform some of the related computations. Also, they enable the DSMC to manage vectored DSL systems to meet quality of service and prioritization requirements among DSL customers. These benefits in turn create opportunities for DSL providers to offer equipment and services with higher performance and at a lower total cost.

Embodiments of the methods, techniques, computer program products, apparatus, devices, etc. to permit better control and operation of a vectored DSL system or similar digital communication system, both in the case of field systems and in the case of lab systems, as further explained and defined below. Various embodiments include the implementation of a digital cross-connect or of a switch to enable the best routing of DSL loops to vectoring engines to maximize the benefits of vectoring and to minimize the implementation costs of vectoring. Also, various embodiments include the implementation of timestamping (that permits more accurate measurement, monitoring, control, etc. of a system), customized data collection techniques, extended parameter definitions for data and/or control parameters, and implementation of these in both field and lab settings.

Various embodiments of the invention also utilize methods, techniques, computer program products, apparatus, devices, etc. to reduce the complexity of vectored DSL transceivers located at the DSLAM or the CPE. Various embodiments include the implementation of communication between a DSL transceiver and a DSL optimizer to allow vectoring operations to be performed by a DSL manager, DSL optimizer, DSM server, controller, or the like. These vectoring operations may relate to general vectoring controls, tone and line selection, line grouping, initialization functions, showtime operations, data-rates, orders and user priorities or service quality, updating operations and operations related to starting up and shutting down a vectored DSL line.

Figure 15:
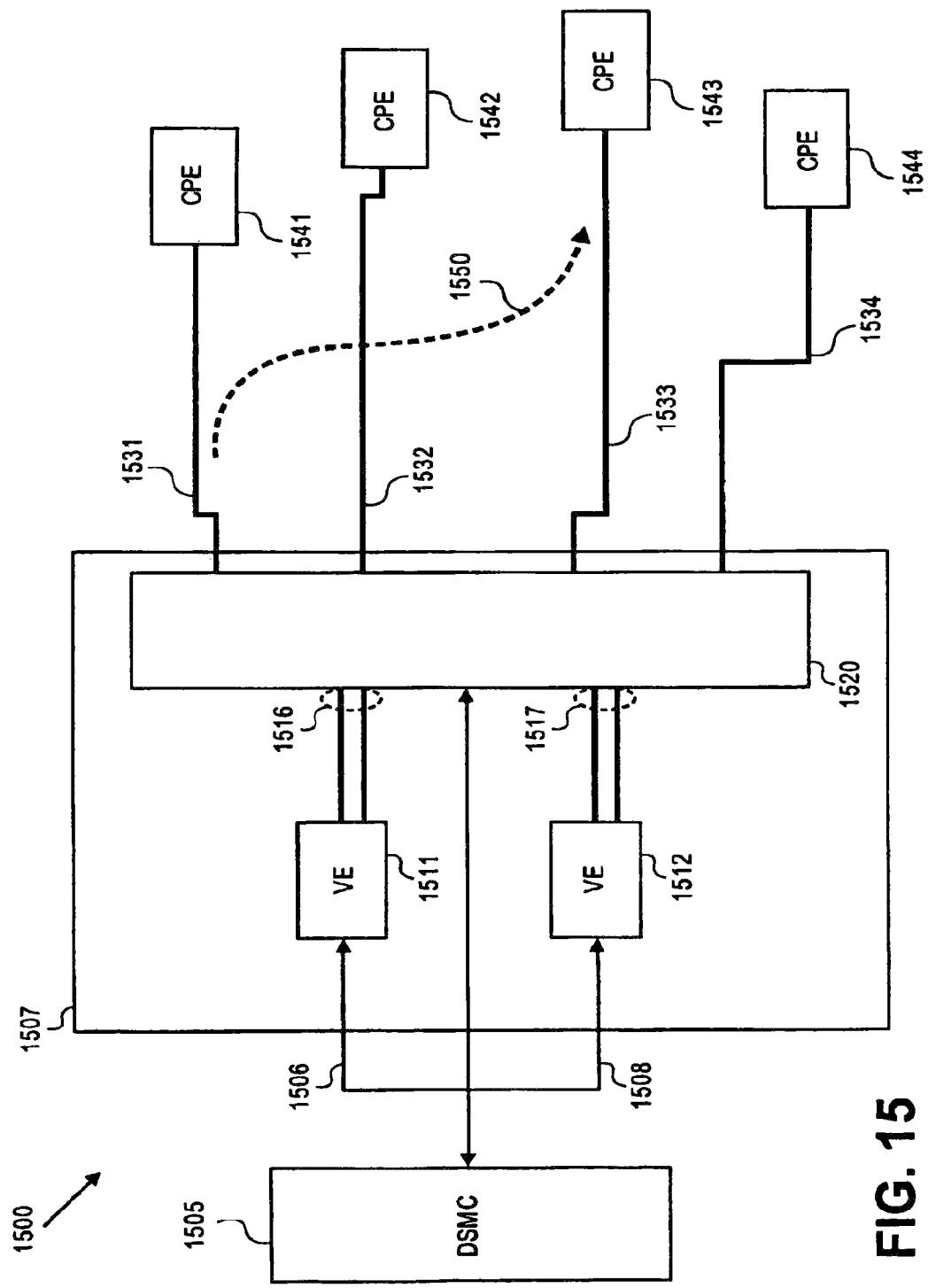
FIG. 15 illustrates a DSL management entity or DSL optimizer coupled to vectoring engines in accordance with an embodiment of the invention.

Embodiments of the invention relate to interfaces between a DSL Management Entity or a DSL optimizer and a Vectored DSLAM, and interfaces between the DSL Management Entity and a digital cross connect. The Vectored DSLAM contains one or more vectoring engines. The network ports of the digital cross-connect are coupled to the CPE modems via DSL loops. The DSLAM ports of the cross-connect are coupled to the DSL ports of the vectoring engines. These are illustrated in FIG. 15. In system 1500 of FIG. 15, a DSL management entity or DSL optimizer 1505 is coupled to the vectoring engines 1511 and 1512 via respective interfaces 1506 and 1508. The Vectored DSLAM (or other upstream DSL device) 1507 contains the vectoring engines 1511 and 1512. The vectoring engines 1511 and 1512 are connected to the digital cross-connect (also referred to herein as switch) 1520's DSLAM ports 1516 and 1517. The networking ports 1522 and 1524 of the digital cross-connect 1520 are coupled to CPE modem 1541, 1542, 1543, 1544 via DSL loops 1531, 1532, 1533 and 1534. Embodiments of the invention define new and improved ways in which the interfaces 1506 and 1508 can be used.

While digital cross-connect 1520 is depicted in the embodiment illustrated in FIG. 15 as an element within Vectored DSLAM 1507, the digital cross-connect can, in alternative embodiments, be located outside the Vectored DSLAM. Furthermore, in the embodiment in which the digital cross-connect 1520 is located inside the Vectored DSLAM, the digital cross-connect may be implemented on a linecard of the Vectored DSLAM, or on an integrated circuit (IC) in the Vectored DSLAM.

In yet another embodiment of the invention, multiple Vectored DSLAMs may be controlled by DSL management entity 1505, in which embodiment, each Vectored DSLAM comprises one or more of the vectoring engines. Digital cross-connect 1520 in such an embodiment is located outside the Vectored DSLAMs, and the DSLAM ports of the cross-connect are coupled to the DSL ports of the vectoring engines in each Vectored DSLAM.

An example showing the importance of a DSM center or spectrum management center (SMC) in making the decisions about enabling vectoring can be explained in connection with FIG. 15. FIG. 15 depicts a system 1500 in which there are 2 vectoring engines 1511 and 1512, each serving 2 DSL lines (for example, engine 1511 serves lines 1531 and 1532 and engine 1512 serves lines 1533 and 1534. This means that a vectoring engine can apply vectoring techniques to only 2 lines at a time. This equipment restriction makes it important to choose the lines on which vectoring is applied. A digital cross connect, or switch, 1520 is implemented in the embodiment of FIG. 15 to properly route the 4 lines to the 2 vectoring engines, which allows a selection of those lines that shall benefit from vectoring. In this example, it is assumed that the line corresponding to CPE 1543 experiences strong crosstalk, as denoted by line 1550, from the line corresponding to CPE 1541. This information may be available to the DSMC 1505 through a variety of ways: Binder identification may have previously revealed this, or wiring information about binder groupings may be available, or it may be known that the DSL services deployed on these lines cause strong crosstalk. Techniques for binder identification can be found in above referenced U.S. patent application Ser. No. 11/342,028.

In this example, the DSMC 1505 may choose to route the lines of CPE 1541 and CPE 1543 to vectoring engine 1511, and to enable Far-end Crosstalk (FEXT) cancellation in the downstream direction for vectoring engine 1511. In such case, DSMC 1505 also chooses to route the lines of CPE 1542 and CPE 1544 to vectoring engine 1512, and may enable FEXT cancellation in the downstream direction for vectoring engine 1512. Alternatively, the DSMC may obtain operational information and provide output to an administrator sufficient to manually control and configure the digital cross connect to properly route lines of particular CPEs to a particular vectoring engine.

Vectoring involves the following steps during initialization:
   Vectoring synchronization
   Vectored channel identification
   Noise correlation identification Vectoring synchronization can be performed by the vectored DSL system using methods similar to those found in the VDSL1 and VDSL2 recommendations for "synchronous mode" operation. Such synchronization is required to achieve proper alignment of the DMT frames corresponding to the DSL lines of the vectored system.

During the vectored channel and noise correlation identification steps, the SMC identifies the lines and tones with the strongest crosstalk coupling or the strongest noise coupling; and sends instruction signals or control parameters to the digital cross-connect to assign the lines with the strongest crosstalk coupling to a common vectoring engine. The SMC also sends instruction signals and control parameters to the vectoring engines to apply vectoring operations on the identified tones. The vectoring operations could be performed on a subset of the lines of the vectored system, or on a subset of the tones of the vectored system.

During binder identification, the SMC uses the X log parameters of the lines obtained from the DSLAM to identify the cross-talk between the lines. Based on the obtained information the SMC sends instructions to place the lines that have high cross-talk on each other in the same group, and sends instructions to place the lines that have low cross-talk on each other into different groups. For the upstream direction, noise correlation information can also be incorporated for grouping the lines. Based on the obtained information, the SMC sends instructions to place the lines that have high cross-talk on each other or have highly correlated noise signals in the same group, and places the lines that have low cross-talk on each other and have nearly uncorrelated noise signals into different groups.

Once grouping is performed, the SMC collects a quality-of-service requirement about the customers served by the lines coupled to each vectoring engine. Based on the quality of service requirement the SMC computes the ordering of the lines coupled to each vectoring engine for decoding (upstream) or encoding (downstream). The SMC then sends an instruction signal to each vectoring engine through the vectored DSL interface to apply the computed line ordering. The quality of service requirement could be based on customer data rates, customer delay requirements, customer priorities, or customer class of service. One method for computing the ordering of the lines comprises computing a rate region and selecting a point in the rate region that meets the quality of service requirement. The SMC instruction signal could be instructions relating to an ordering for receiver vectoring operations (upstream operation) or an ordering for transmitter vectoring operations (downstream operation).

Once the ordering of the lines is specified, the required latency for decoding the lines coupled to each vectoring engine is computed at the SMC based on the decoding order configuration. In some implementations, the latency for decoding of a line is affected by the latency for decoding of those lines that are decoded earlier. Thus, computing the decoding latency of a line may require first computing the decoding latency of those lines with a higher decoding order. The required latency is compared against a maximum latency allowed for each vectoring engine. For each vectoring engine, if the required latency does not exceed the maximum latency, an instruction signal is sent from the SMC to the vectoring engine to apply the specified decoding order configuration.

The instruction signal or control parameters sent by the SMC to the vectoring engines may include the following parameters: maximum decoding delay; minimum impulse noise protection; decoding ordering; tones for applying vectoring; lines for applying vectoring; carrier mask; spectrum mask; data rate; margin; or training sequences.

The above steps compute the settings/coefficients for performing vectoring. One possible implementation approach is for a SMC to aid with the computations of these coefficients. Some general bandwidth requirements are discussed below.

The outputs of vectored channel identification and noise correlation identification are complex quantities equal to the number of tones over which vectoring is applied. A set of 1000 tones can be used as an exemplary tone set that requires 16 bits for each of the real and imaginary part. Further, this example can assume that only significantly large elements of the channel and noise correlation matrices need to be transmitted. The assumption is that for each row of these matrices, at most 3 elements are significant. For 2 vectored lines, 32 Kbytes of data needs to be exchanged. For 4 vectored lines that data amount goes up to 96 Kbytes. Finally, for 8 vectored lines, 192 Kbytes of data needs to be exchanged. For 4 vectored lines in more detail, there are 2 tables each with 4 rows, where from each row only 3 elements need to be transmitted, and where each elements contains 32 bits. There are 2 such tables for each of the 1000 tones, which results in $(2) \times (4) \times (3) \times (32) \times (1000) = 768000$ bits=96 Kbytes. This exchange should be completed within a time-period in the order of 1 second. Thus, the vectored line estimates above give crude estimates of the requirements of such an interface in the direction from the modem to the DSMC.

The requirements in the direction from the DSMC to the modem are mainly dominated by the need to set the feedforward and feedback filters for vectoring (either for downstream or for upstream). These again represent 2 matrices, which are either sparse (for example, only 3 significant entries per row), or can be represented with fewer parameters (for example, rotors). This observation suggests that the bandwidth requirements in the direction from the DSMC to the modem are within the same order of magnitude as those for the direction from the modem to the DSMC. Note that the DSMC can also perform computations such as bit loading, or initial determination of Time Domain Equalizer (TEQ) filtering, or initial determination of Frequency Domain Equalizer (FEQ) taps, to alleviate the initialization burden. A DSMC can perform such computations using techniques such as those disclosed in the above referenced U.S. patent application Ser. No. 11/344,873.

Typical DSL transceivers are implemented using at least one integrated circuit and one or more discrete components external to the integrated circuit. The at least one integrated circuit (also known as a chipset) and one or more discrete components are placed on circuit boards. In DSLAM equipment, a circuit board may include integrated circuits and discrete components to support operation of multiple DSL lines. A plurality of such circuit boards (sometimes also known as line-cards) may be included in a DSLAM, thus potentially supporting large number of DSL lines.

Figure 16:
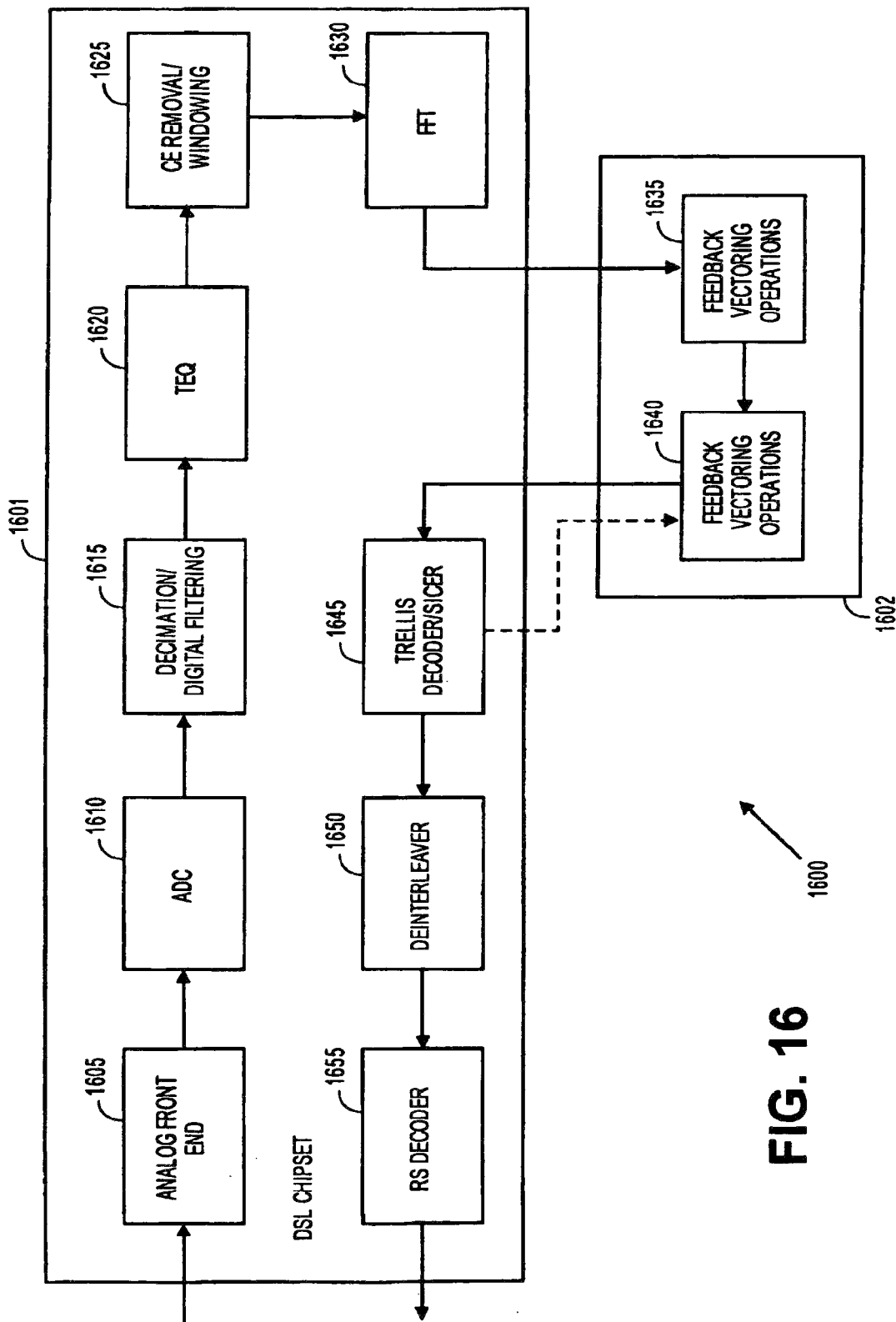
FIG. 16 illustrates an implementation for showtime signal processing related to vectoring to be performed externally to a receiver chipset in order to reduce the computational requirements within the chipset in accordance with an embodiment of the invention.

A potential implementation approach for a vectored DSL system is for some showtime signal processing related to vectoring (such as FEXT cancellation or noise decorrelation) to be performed externally to the chipset that implements the main functions of the DSL transceiver. Such an approach allows a reduction of the computational requirements within the chipset. This externally implemented vectoring is depicted in FIG. 16 for a receiver implementation. Those skilled in the art will recognize for similar externally implemented vectoring is possible for a transmitter implementation. The received signal on a DSL line is first processed through the Analog Front End 1605 of DSL chipset 1601. The analog signal is then converted into digital form by the Analog-to-Digital Converter (ADC) of 1610. The digital signal may undergo decimation and digital filtering by 1615. In some embodiments, a Time-domain Equalizer (TEQ) is applied on the signal to reduce Inter-Symbol Interference (ISI). The resulting signal samples then are grouped into DMT symbols, the cyclic extension is removed, and a receiver windowing operation may be applied. The DMT symbols are then provided as input to an FFT operation.

For vectored DSL systems, feedforward vector filtering 1635 is applied and consequently feedback vector filtering 1640 is applied. The feedforward vector filtering 1635 has as an input the outputs produced by the FFT modules 1630 of the vectored lines. The output of the feedback filtering 1640 is provided as input to the Trellis Decoder/Slicer modules 1645 of the vectored lines. The feedback vector filtering may optionally accept additional input from the Trellis Decoder/Slicer modules 1645 of the vectored lines in the form of decoder error metrics. The output of the Trellis Decoder/Slicer module 1645 is provided to the Deinterleaver 1650, and finally the RS Decoder 1655 performs the Reed-Solomon decoding of the data stream. For such processing, the vectoring operations 1635 and 1640 may be performed by an external module 1602, in order to reduce the load for processing on the chipset 1601.

As above, some interface examples can be evaluated. Again, 1000 active tones can be used, which need to be decoded and on which vectoring is applied. Each complex sample again can be represented by 16 bits per dimension. A DMT symbol rate of 4 kHz also can be used. This translates to a need to exchange 32 bits/tone×1000 tones/frames×4000 frames/sec=128 Mbps in each direction. The resulting bidirectional bandwidth requirements for multiple users can then be determined. For 2 vectored lines, 512 Mbps is required; 1024 Mbps is needed for 4 vectored lines; and 2048 Mbps is needed for 8 vectored lines. It is evident that the interface speed requirements are high for this case.

There are a number of updating operations that are needed for vectoring, and a SMC may provide assistance. First, in addition to the usual bits and gains updating, vectoring may also require updating of the ordering of the users. Updating may also be required to the vectoring module settings, for example the coefficients of the feedforward and feedback filters. The computation of the updated settings may be performed by a SMC. The transmitter precoding may require a feedback channel of considerable bandwidth between the receivers and the corresponding transmitters. It also requires either blind channel/noise identification during showtime, or the existence of a periodic reference symbol such as the synchronization frame of VDSL2. Such updating can include techniques disclosed in the above referenced U.S. patent application Ser. No. 11/344,873.

If such updating is assumed by a SMC, then channel and noise information (or equivalent information for updating such as error metrics) is communicated to the SMC. The expected interface requirements are similar to those described previously with regard to initialization. One potential advantage here is that only a small subset of tones may need to be updated at each time, such updates being performed at considerably slower rates than the DMT symbol rate. Additionally, the determination of order/priority of users based on service provider product offerings and the binder crosstalk and dynamics is a complex function and is best performed by a SMC where the computational power can be shared over many customers/lines.

Modem on/off switching is an important issue with regard to vectoring updating. The role of interfaces between the vectoring engine and the SMC in this regard is illustrated by the following examples:

Example 1

If a modem belonging to a vectored system shuts down, then the effects are minimal for vectoring operations at the transmitter. For vectoring operations at the receiver, however, such a modem shutdown has significant effects. Noise decorrelation (and/or other operations requiring feedback) may lose effectiveness if a line is lost. One potential receiver solution is for the decoding operation of the line to continue in a state where the noise samples are detected and provided to the other receiver paths for noise decorrelation. With such an orderly modem shutdown, the SMC may send instructions to coordinate the shutdown and prepare vectoring modules for the change. Thus the DSMC plays an important role in such a shutdown.

Example 2

If a new line needs to enter a vectored system, a series of steps are taken to permit operation without disruption. If a SMC has information about the crosstalk coupling and operation status of other lines, then the DSMC can control the introduction of the new line, minimizing crosstalk effects. One way to achieve this is to restrict the transmitted power of the new line to low levels initially, and to increase the power only gradually. The interface requirements for the above functions of the DSMC are modest. If the SMC does not have information about the new line's crosstalk coupling, noise correlation and/or operation status, the SMC instructs the new DSL line to provide its operational data, and collects the new line's operational data from the vectored DSL system. The DSMC instructs the digital cross-connect to assign the new line to one of available vectoring engines.

Example 3

A function of the SMC in non-vectored as well as vectored operation is the determination of the maximum safe data rate at which the line can operate with acceptably low probability of service disruption or loss (or customer complaint). This vectoring function is strongly related to other lines in the binder and the selected data rates and crosstalking priority choices. A SMC can calculate the best data rates, including not only the binder crosstalk information and consequent canceller coefficients, but also the history of the line and binder in terms of use patterns, noise occurrences, instances of impulse noise or other non-stationary behavior. Such calculations also can incorporate the service providers' products (that is, data rates and quality of service requirements at those data rates, which are also a function of the customer service selection and willingness to pay), billing management, and general provisioning practice and coordination with operations. The SMC then supplies the profile (for example, comprising one or more of the following—data rate, margins, power levels, and PSD) along with any vectoring information to the DSL line for implementation (usually through the DSLAM or element management system MIB). This function makes use of statistical information from observations over a wide range of lines as well as inputs from the service provider and is not economically implemented in each DSLAM. There is an order of cancellation used in a well-designed vectored system (linear-only systems can see significant performance loss if evaluated correctly) that is also supplied and not efficiently computed locally at the DSLAM.

Figure 7A:
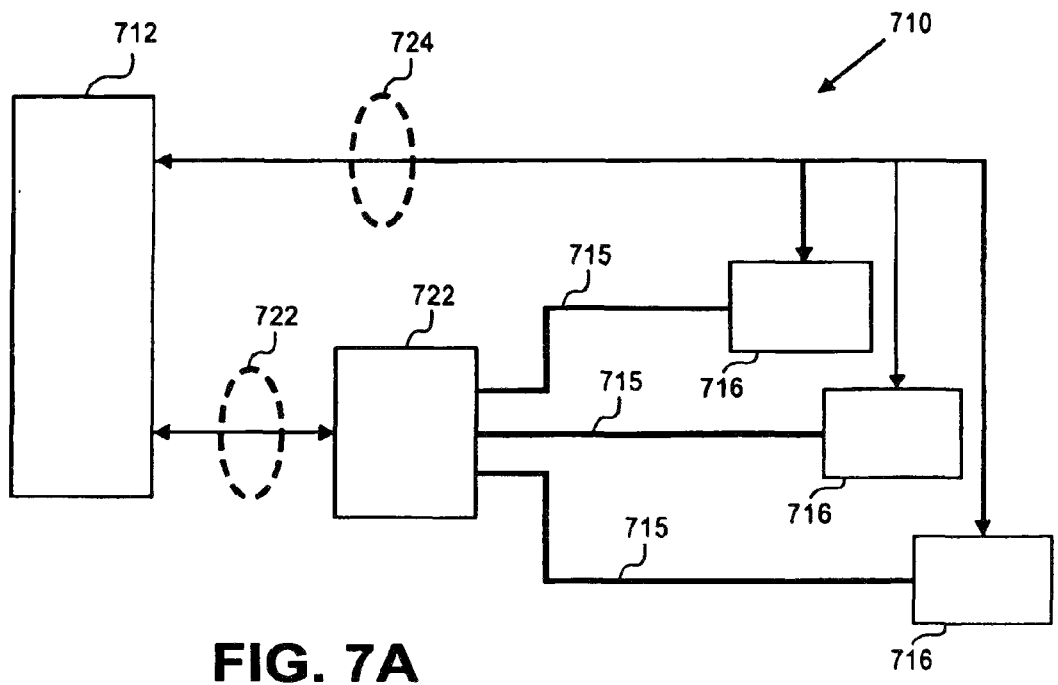
FIG. 7A illustrates an embodiment of the invention relating to interfaces between a DSL management entity and a Vectored DSLAM, and/or between a DSL management entity and a DSL CPE modem.

Embodiments of the invention relate to interfaces between a DSL Management Entity and a DSLAM, and/or between a DSL Management Entity and a DSL CPE modem. These are illustrated in FIG. 7A. In system 710 of FIG. 7A, a DSL management entity 712 is coupled to a Vectored DSLAM (or other upstream DSL device) 714 and/or to one or more CPE modems (or other downstream DSL devices) 716. Vectored DSLAM 714 and modems 716 are coupled to each other via DSL loops 715. DSL management entity 712 communicates with Vectored DSLAM 714 using an interface 722. DSL management entity 712 communicates with modems 716 using an interface 724. Embodiments of the invention define new and improved ways in which these interfaces 722, 724 can be used. Moreover, embodiments of the invention can be used with a "field" or a "lab" communication system.

There are various current DSL management interfaces. Three published standards known to those skilled in the art relate to interfaces for DSL management:
  ITU-T standard G.997.1, "Physical layer management for digital subscriber line transceivers," and
  DSL Forum TR-069, "CPE WAN Management Protocol;"
  ATIS Technical Report, "Dynamic Spectrum Management", ATIS-0600007

G.997.1 specifies the physical layer management for DSL transmission systems based on the usage of indicator bits and EOC messages defined in the G.992.x and G.993.x series of ITU-T Recommendations and the clear embedded operation channel defined in G.997.1. It also specifies Network Management elements content for configuration, fault and performance management.

Figure 7B:
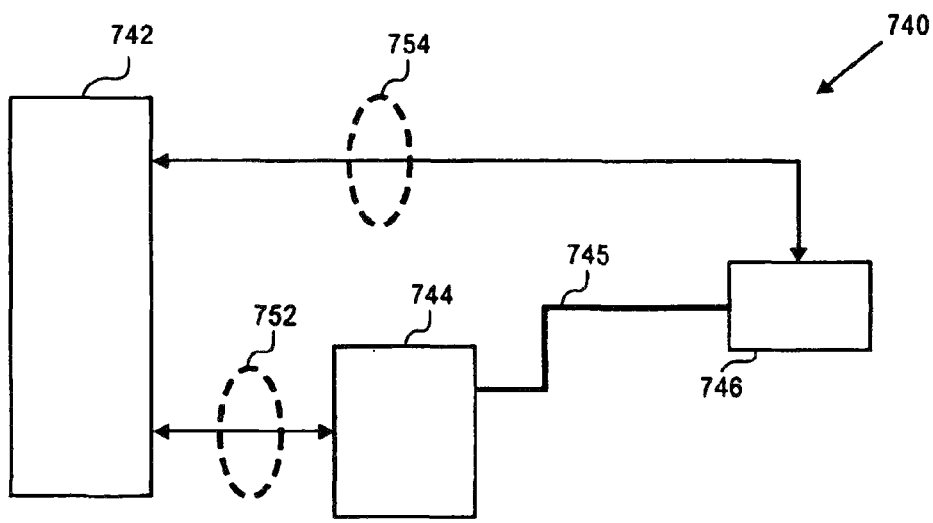
FIG. 7B illustrates a DSL Management Entity 742 available to a CPE modem or a Vectored DSLAM via separate interfaces in accordance with an embodiment of the invention.

G.997.1 defines the Q interface (shown, for example, in FIGS. 1, 1A, 3, 3A and 6A) between an Access Node (referred to at some points in the present disclosure as a DSLAM or other DSL device) and any Network Management Systems, which may be considered part of the DSL Management Entity in embodiments of the invention. TR-069 describes the CPE WAN Management Protocol, intended for communication between a CPE and an Auto-Configuration Server (ACS), which may be considered part of the DSL Management Entity in embodiments of the invention. These are shown in FIG. 7B, in which DSL Management Entity 742 is available to:
- CPE modem 746 via interface 754; and/or
- Vectored DSLAM 744 via interface 752.

The Vectored DSLAM 744 and modem 746 are coupled to one another by DSL loop 745.

Neither G.997.1 nor TR-069 was designed to support vectored DSL systems. Interfaces bypassing the TCP/IP network stack and/or providing higher speed and lower latency have particular advantages for the management of vectored DSL systems. Embodiments of the invention overcome at least some of the limitations of the interfaces defined in G.997.1 and TR-069, such as:
- No dating or time identification capability for data or control parameters;
- No customizable data collection for each DSL line;
- Very slow data reporting and controlling (time frame of minutes);
- Insufficient control parameters for vectored DSL systems;
- Insufficient reported data parameters for vectored DSL systems; and
- Inability to specify and/or arbitrate the importance of users within a
- crosstalk-canceling system by controlling or specifying their order placement during initialization or showtime operation.

TR-069 defines a "CPE parameters" list in its Appendix B. These parameters can be accessed for reading or (for a subset of them) for writing using the Remote Procedure Call (RPC) methods defined in Appendix A of TR-069. Examples of embodiments of the invention focus mainly on the parameters under the following "branches" of Table 61 of TR-069:
- InternetGatewayDevice.WANDevice.{i}.WAN-DSLInterfaceConfig; and
- InternetGatewayDevice.WANDevice.{i}.WAN-DSLDiagnostics.

Several of the parameters under the first of the above branches are defined as holding "current" values. For example:
- UpstreamAttenuation
- DownstreamAttenuation
- Upstream Power
- Downstream Power However, the definition of "current" is elusive, because multiple operations (each with considerable processing delay) are required to complete the update of these parameters. In some cases, it may be impossible for DSL equipment to update these parameters continuously. Thus, the exact length of time since the last update of these parameters has been really unknown in earlier systems. Particularly for vectored DSL, the accuracy required for knowing the time at which parameters were last updated may be as small as the length of a DMT symbol.

The parameters defined under the second of the above branches are intended to be used only after a diagnostics operation has been completed. However, most of these parameters also can be computed without a diagnostics operation. They can be derived during normal modem initialization, or they can even be updated during showtime. But the problem of not knowing exactly when these parameters were last computed/updated has remained. Particularly for vectored DSL, it is important to know the exact time at which parameters were obtained, as the effectiveness of vectoring operations relies on timely information about the vectored channel and the noise correlation. It is important to be able to identify parameter values that are not current, because use of such non-current parameter values when performing vectoring operations may actually degrade the DSL performance.

Finally, there has been a problem in earlier systems in accessing these parameters to write to them. With existing schemes, there is no way to schedule a write operation with a known and/or specified delay. This may be desirable, for example, when multiple write parameters need to be written in a specific order. Again, this is important for vectored DSL, because write operations to specific vectoring modules must take effect at exactly defined times (within an accuracy on the order of a DMT symbol). Failure to apply write operations at the proper times may lead to system instability and/or loss of connection.

Section 7 of G.997.1 defines Management Information Base (MIB) elements, and explains which of them can be read and written through the Q interface. Like the situation with TR-069, there are such elements for which a last update time is unknown. Specifically, most of the elements under the "Line Test, Diagnostic and Status Parameters" group (per G.997.1 Tables 7-23 and 7-24) are such that it is unclear when they were computed. Such computation may have taken place during any of the following times:
- Diagnostics execution
- Normal initialization of modem
- Normal operation of modem (showtime)
- Periods where some modems may be initializing while others are already operating in showtime On the other hand, writing to MIB elements does not include any capability for scheduling or otherwise identifying when a control parameter might be enforced and/or implemented. There is no way to distinguish between performing a write operation and forcing an immediate re-initialization of a modem or other DSL device, and a write operation expecting the modem to adapt gracefully without exiting showtime or otherwise interrupting normal operation. Examples of elements requiring such a feature can be found under the "Line configuration profile" and "Channel configuration profile" groups (per G.997.1 Tables 7-9 to 7-12).

Figure 8A:
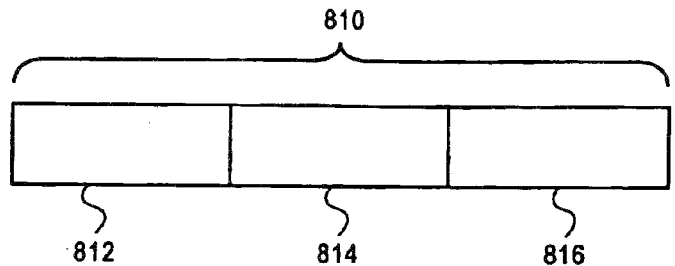
FIG. 8A illustrates a timestamp is associated with the "CPE parameters" of TR-069 and/or the "MIB elements" of G.997.1.

In some embodiments of the invention, a timestamp is associated with the "CPE parameters" of TR-069 and/or the "MIB elements" of G.997.1, providing a time indication of when they were last updated (for read-only parameters), or a time indication of when they should be enforced (for write parameters). One example of this is shown in FIG. 8A, where a packet 810 includes a timestamp 816 that is associated with the name 812 and value 814 of the operational parameter. For read-only (data) parameters, the timestamp could include one or more of the following types of information:
- Was the update performed during a particular phase and/or in a specific operating mode such as diagnostics, normal initialization, or showtime?
- When was update performed relative to a time reference? (for example, relative to start of most recent re-initialization, or relative to absolute time)

For write (control) parameters, the timestamp could include one or more of the following types of information:
- Will the update force an initialization?
- Will the update be enforced immediately, with a certain delay, or with the next initialization?
- What is the delay of the update relative to a known time reference?

Figure 8B:
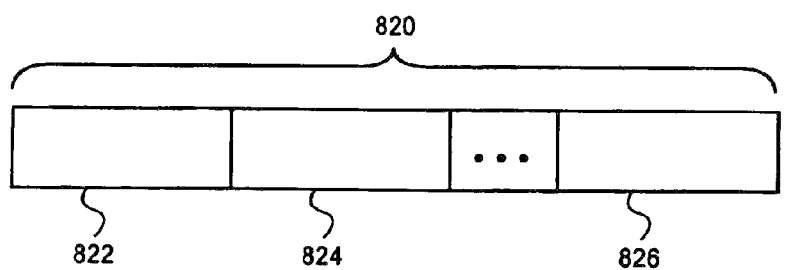
FIG. 8B illustrates grouping together data and/or control parameters associated with an identical timestamp in a single packet to be transferred over a DSL Management interface.
Figure 8C:
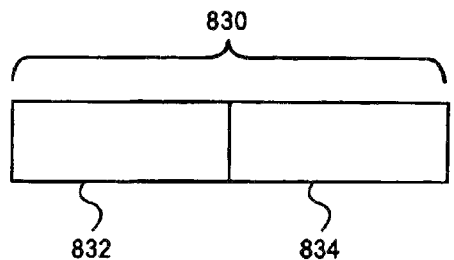
FIG. 8C illustrates a timestamp associated with time markers.

The general concept can be implemented with any of multiple approaches, as will be appreciated by those skilled in the art. Note that for vectored DSL, time references need to be accurate within a time period on the order of a DMT symbol. In one approach, illustrated in FIG. 8B, data and/or control parameters 822, 824 associated with an identical timestamp 826 can be grouped together in a single packet 820 to be transferred over a DSL Management interface. A single timestamp thus is associated with all the parameters, as illustrated in FIG. 8C.

Alternatively, time markers can be defined and used to provide the timing information for the parameters. For example, in FIG. 8C an operational parameter 832 is associated with a time marker 834 in a packet 830. A number of time markers can be defined as shown in the exemplary table of FIG. 8C. Each operational parameter can then be associated with one of the pre-defined time markers. As will be appreciated by those skilled in the art, lines x1, x2, x3 and x4 referenced in the table of FIG. 8C may be the same DSL line or multiple lines used to establish the time markers. Moreover, using time markers can be implemented as an extension of the TR-069 RPC methods using the following steps:

1. Introducing a new set of CPE parameters to store Time Markers.
2. Extending the ParameterValueStruct structure definition (per Table 11 in A.3.2.1 in TR-069) to include Time-Marker as one of the structure members, thus creating the new structure ParameterValueTimeStruct.
3. Enhancing the GetParameterValues method (per A.3.2.2 in TR-069) to allow for ParameterValueTimeStruct elements in the ParameterList array. Whenever GetParameterValues is called to read the values of time-critical CPE parameters, the Time Markers should also be included in the ParameterList.
4. Enhancing the SetParameterValues method (per A.3.2.1 in TR-069) to allow for ParameterValueTimeStruct elements in the ParameterList array. Whenever SetParameterValues is called to write to time-critical CPE parameters, the corresponding Time Markers should also be included in the ParameterList.

Figure 10:
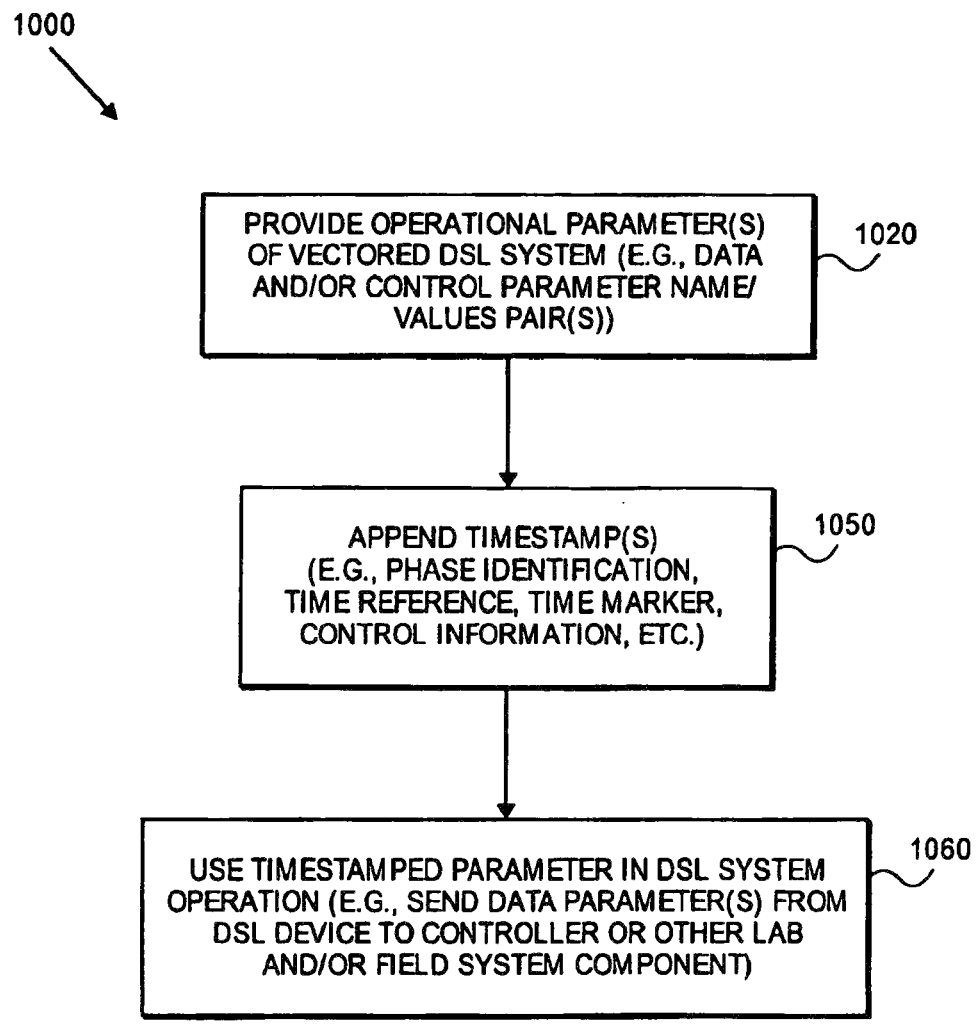
FIG. 10 illustrates a method of operating a DSL system, including timestamping used in connection with one or more operational parameters.

Therefore, according to some embodiments of the invention, one or more of which are shown in FIG. 10, a method 1000 of operating a DSL lab and/or field system (and/or a computer program product implementing such methods) can include timestamping used in connection with one or more operational parameters (for example, data, control, operational, etc. parameters). Generally, one or more operational parameters of a vectored DSL system are provided at 1020 and a timestamp is appended to that/those operational parameter(s) at 1050. ("Appending" as used herein may mean physically attaching a timestamp or timestamp data to other data or may mean associating the timestamp with the relevant data in some other way, as will be appreciated by those skilled in the art.) The operational parameter then can be used at 1060 in operating the DSL system (for example, as a data parameter or a control parameter) or can otherwise be used to assist in operating the DSL system (which can be a field DSL system, a lab DSL system, etc.). As noted above, appending the timestamp can be implemented by associating the timestamp with the name and value of the operational parameter or in other ways described herein and otherwise apparent to those skilled in the art. The DSL devices with which the invention can be used include (but are not limited to) modems, DSLAMs, line cards, remote terminals, line terminals, Auto-Configuration Servers, various implementations or components of Network Management Systems (sometimes also known as Element Management Systems) and the like. Embodiments of the invention can be implemented in DSL systems such as those shown and discussed herein and others known to those skilled in the art.

Where a data parameter (that is, a parameter that is read-only) is involved, the timestamp can be a phase identification and/or a time reference. A phase identification can identify the operating mode a DSL or other system was in when the data parameter was last updated or any other temporal description regarding phase of operation. Examples of operating modes include diagnostics, normal initialization, showtime, etc. For vectored DSL, phase of operation may be accompanied by a specification of the line of interest, and it may refer to events such as vectoring coefficient updates. A time reference can be a point in time defined by absolute time, a point relative to one or more phase transitions (for example, from initialization to showtime), a point in time defined relative to one or more phase-defined events (for example, 30 seconds after entering showtime, 564 seconds after last initialization, etc.), etc. For vectored DSL, a time reference may be defined in terms of DMT superframes (or DMT sync symbols), or even more finely in terms of DMT symbols (for example, 6354 DMT superframes after line 3 enters showtime, or 78764 DMT superframes plus 67 DMT frames after the last update of the vectoring coefficients of line 1).

Where a control parameter (that is, a parameter that is written) is involved, the timestamp can be, for example, information regarding whether the update will force initialization, information regarding when the update will be enforced and/or implemented, information regarding any delay between a known time reference and the enforcement and/or implementation of the update, etc. Other useful and implementable timestamps are known to those skilled in the art.

When a number of operational parameters are to be assigned or have the same timestamp, grouping of the operational parameters can be used, as noted above. For example, a number of operational parameters can be grouped together and then have a single timestamp appended to the group. In other cases, a group of timestamps can be defined and identified by time markers. Appending the timestamp to an operational parameter then can be accomplished by associating one of the defined time markers with the operational parameter.

As will be appreciated by those skilled in the art, computer program products using embodiments of the invention can include a machine-readable medium and program instructions contained in the machine-readable medium. The program instructions specify a method of operating a Vectored DSL system according to one or more of the methods described herein.

In TR-069, the data collection for the DSL Physical Layer parameters is performed in exactly the same way for all CPEs:

InternetGatewayDevice.WANDevice.{i}.WAN-DSLInterfaceConfig. parameters should hold current values (e.g. DownstreamNoiseMargin).

InternetGatewayDevice.WANDevice.{i}.WAN-DSLDiagnostics. parameters should hold values from the last diagnostics session (e.g. SNRpsds).

InternetGatewayDevice.WANDevice.{i}.WAN-DSLInterfaceConfig.Stats.Total. parameters hold total statistics (e.g. FECErrors since the beginning of data collection).

InternetGatewayDevice.WANDevice.{i}.WAN-DSLInterfaceConfig.Stats.Showtime. parameters hold statistics accumulated since the most recent showtime.

InternetGatewayDevice.WANDevice.{i}.WAN-DSLInterfaceConfig.Stats.LastShowtime. parameters hold statistics accumulated since the second most recent showtime.

InternetGatewayDevice.WANDevice.{I}.WAN-DSLInterfaceConfig.Stats.CurrentDay. parameters hold statistics accumulated during the current day.

InternetGatewayDevice.WANDevice.{i}.WAN-DSLInterfaceConfig.Stats.QuarterHour. parameters hold statistics accumulated during the current quarter hour.

There also are parameters indicating the number of seconds since the beginning of data collection, since the most recent showtime, etc.

This approach misses the capability to adjust the data collection independently for each line. For example, for problematic or other lines, it may be desirable to be able to collect data more frequently compared to stable lines. Vectored lines may also require closer monitoring to determine whether updates are needed, or to detect situations when modems are turned on or off, etc. The additional data can be used to diagnose problems and suggest solutions. On the other hand, requiring all lines to collect data very frequently typically is impractical, because it leads to much higher memory and communication bandwidth needs that are not justifiable for all lines involved.

In G.997.1, there are MIB elements for:

Line performance monitoring parameters (e.g., Errored Seconds)

Channel performance monitoring parameters (e.g., FEC corrections)

ATM data path performance monitoring parameters (e.g., HEC violations)

For these elements, counters are defined over periods of 15 minutes and 24 hours. For Errored Seconds, Severely Errored Seconds, and Unavailable Seconds, counters also are stored for the past 16 intervals of 15 minute duration (see G.997.1, section 7.2.7.9).

There also are MIB elements for (1) line test, diagnostics and status parameters (e.g., SNR margin downstream), and (2) channel test, diagnostics and status parameters (e.g., actual interleaving delay). These elements store only "current" values, as the term "current" has been applied to earlier systems and the like.

Finally, there are MIB elements storing threshold values for monitoring parameters. When the threshold values (defined over periods of 15 minutes and 24 hours) are exceeded, then a "threshold report" is generated and transmitted over the Q-interface.

Like TR-069, the definition of the MIB elements in G.997.1 does not allow customized data collection for each line. It therefore is impossible under those guidelines to collect certain parameters at a faster rate (or to collect more data points within a given time period), so that more information can be collected for problematic lines.

Embodiments of the invention permit customized and/or adaptive data collection to define the data collection procedure individually for each CPE, DSLAM or other DSL device. Multiple values are stored for each parameter, each corresponding to different instants in time. The times at which the parameter values are stored are programmable for each DSL device individually.

An example illustrates benefits and implementation of one embodiment of the invention. Assume that CPE "A" is a stable line, which needs only occasional monitoring. Parameters (such as the SNR margin) then can be collected infrequently or on a "normal" basis (for example, every hour), simply to make sure that the line remains stable, as shown in the following table:

TABLE 1

Example of Adaptive Data Collection for stable line
CPE A (stable line)

Value of SNR Margin at 2:00pm
Value of SNR Margin at 3:00pm
Value of SNR Margin at 4:00pm
Value of SNR Margin at 5:00pm However, if CPE "B" is a problematic line, closer monitoring can be used to determine the cause(s) of instability. It is desirable to collect parameters such as the SNR margin more frequently (for example, every quarter hour) in order to better pinpoint the time at which the problem arises, as shown in the following table:

TABLE 2

Example of Adaptive Data Collection for problematic line
CPE B (problematic line)

Value of SNR Margin at 4:00pm
Value of SNR Margin at 4:15pm
Value of SNR Margin at 4:30pm
Value of SNR Margin at 4:45pm
Value of SNR Margin at 5:00pm Generally, customized data collection according to the invention may require that each parameter (or group of parameters) be associated with one or more of the following variables:

Data collection start time

Data collection period

Data collection end time, or total number of data collection points

The first and third variables can be omitted in some embodiments.

Customized data collection according to the invention can be integrated with TR-069 or with G.997.1, as will be appreciated by those skilled in the art. For TR-069 the following steps can be used to augment TR-069 operation:

Creating new CPE parameters (or MIB elements) for specifying customized data collection.

Extending CPE parameters (or MIB elements) with customized data collection capability to vector types. Whenever data collection fills up a vector, either stop data collection, or write new values over the oldest values.

Finally, "threshold reporting" can enhance data collection with TR-069. One way to achieve this is by modifying the SetParameterAttributes method (per A.3.2.4 in TR-069). Currently, setting the Notification field in the SetParameterAttributesStruct structure allows the CPE to notify the DSL Management Entity of a parameter that has changed value. By including an additional field to the SetParameterAttributesStruct structure, the notification can be triggered by events such as a parameter exceeding a certain threshold (for example, an error metric exceeding a certain value in a vectored DSL system, where the notification serves to indicate that an update to the vectoring coefficients is needed). Alternatively, a notification may be sent when a parameter value falls below a threshold value. The "trigger field" may have the following allowed values:

A special value indicating that the triggering event is any change of the value.

A range of threshold values for triggering a notification.

Methods for adaptive data collection in a DSL loop according to one or more embodiments of the invention are shown in FIGS. 11 and 12. The method 1100 of FIG. 11 begins with the selection of one or more data parameters of a vectored DSL system for customized collection at 1110, which may include evaluating performance of the DSL loop while the DSL loop is using a first data collection procedure, such as a normal data collection operation per TR-069 or G.997.1. A second data collection procedure for the DSL loop based on the evaluation of the DSL loop performance can then be determined (for example, collecting data more or less often, or collecting more or fewer data points for evaluating the loop's performance) at 1120. Once a different data collection procedure has been determined and/or defined at 1120, the attributes can be sent from a controller (for example, a DSL management entity) to a DSL device (for example, a CPE modem) at 1130 and thereafter operation of the DSL loop can be adapted at 1140 to use the second data collection procedure by sending the value/vector of values for each data parameter to the controller from the DSL device. Thus it may be the data collection frequency that is adjusted during performance of such methods.

Where threshold reporting is used, as shown by method 1200 in FIG. 12, the data parameter of a vectored DSL system is chosen at 1210 and assigned one or more attributes at 1220. Again, the attributes are sent at 1230 from the controller to the DSL device, after which the data parameter value(s) are sent from the DSL device back to the controller at 1240 when the threshold conditions are met.

As will be appreciated by those skilled in the art, such methods can be applied to all the loops in a DSL binder, to a group of vectored DSL lines or to any other suitable group so that data collection can be appropriate on a loop-by-loop basis. Such methods can be performed by computer program products (for example, software) or a controller of some sort, such as a DSL optimizer, SMC or the like. Moreover, these methods can be extended so that one or more operational parameters may be considered and evaluated, as appropriate. For each such operational parameter, a data collection start time, collection period and end time can be designated. In some cases, as noted above, it may only be necessary to designate a data collection period for each operational parameter. The loops with which such methods are used also can be programmed and/or otherwise configured to notify a controller or the like whenever an operational parameter threshold value or range is achieved or lost, such as a maximum value, a minimum value, a sufficient change in the operational parameter value or where the operational parameter's value falls outside or within a specified range. As noted above, one or more of these methods can be implemented as an extension of TR-069 and/or G.997.1, as will be appreciated by those skilled in the art.

In TR-069, the DSL Physical Layer parameters are defined under the following branches:

InternetGatewayDevice.WANDevice.{i}.WAN-DSLInterfaceConfig.

InternetGatewayDevice.WANDevice.{i}.WAN-DSLDiagnostics.

None of these parameters can be written by a DSL Management Entity, except for InternetGatewayDevice. WANDevice.{i}.WAN-DSLDiagnostics.LoopDiagnosticsState, which is used to trigger DSL diagnostics.

This limitation of TR-069 implies that the only path for configuring the DSL Physical Layer of the CPE is through the means provided by G.997.1, or through the message exchange performed between a DSLAM and CPE during initialization. However, this earlier solution is problematic in a variety of circumstances:

Broken DSLAM controls—In certain situations, it is impossible to control the CPE parameters from the DSL Management Entity due to implementation issues. There are several points where the communication path may be broken. For the path to work properly, a large number of elements need to function properly—the Q-interface must include the needed controls, the DSLAM implementation of the management portion must be complete, the message overhead path between the DSLAM and CPE must be implemented correctly, and the CPE implementation of the management portion must be complete.

Restricted set of G.997.1 CPE configuration parameters—It would be advantageous to have many of the CPE parameters not currently defined as programmable in G.997.1 be programmable. For example, it would be helpful to be able to program the maximum number of bits that can be loaded on a specific tone.

Configuration parameters for vectored DSL—It would be advantageous to have parameters related to vectoring operations that can be controlled outside the DSLAM. This reduces the management burden of the DSLAM and moves complexity to the external management system.

Parameter values available too late to the CPE—Some parameters are communicated from the DSLAM to the CPE during various stages of initialization (for example, maximum SNR margin). However, the CPE may need to know these parameter values much earlier in order to optimize the link. For example, in the case of maximum SNR margin, the CPE must decide the proper transmission Power Spectral Density (PSD) level at an early stage.

Some G.997.1 limitations related to the DSL configuration controls of the CPE have been mentioned above. Additionally, the G.997.1 MIB elements are missing a number of configuration parameters that are valuable for DSL Management, especially for vectored DSL. Additional useful elements are discussed below.

Using embodiments of the invention to improve the DSL configuration controls of the CPE, certain CPE parameters can be made programmable by a controller, such as a DSL Management Entity. In this case, the questions may arise about possible conflicts between the values programmed directly by the controller (DSL Management Entity) and the values instructed by the DSLAM. There are various ways to resolve such conflicts:

A CPE parameter can be defined to indicate whether the DSLAM values or the DSL Management Entity values have priority in cases of conflict; or If one or more values instructed by the DSL Management Entity results in a failed link, or in some other abnormal situation, then the CPE parameters can be reset and/or the link reinitialized with the DSLAM values having priority. After the link is re-established, the CPE may report the abnormal situation to the DSL Management Entity.

A list of control parameters usable with a CO or a CPE modem for DSL configuration in connection with an embodiment of the invention is shown in Table 3A, below. A list of control parameters usable either with a CO or a CPE modems for Vectored DSL configurations in connection with an embodiment of the invention is shown in Table 3B, below. In FIG. 3B, order swap has been included because the priority of a user might be changed and its position within the canceling order might be changed (perhaps along with a rate change). The canceller remains the same on all common previous users in the order, so order swapping may be a quick fix to various data requests without having to set all the cancellers, spectra and bit distributions.

TABLE 3A

Control parameters for CO or CPE configuration

| Parameter | Comments |
|---|---|
| Transmission System Enabled | Indicates which among the possible transmission systems are allowed |
| Power Management State Forced | |
| Power Management State Enabled | |
| L0-TIME | |
| L2-TIME | |
| L2-ATPR | |
| L2-ATPRT | |
| MAXNOMPSDdn | |
| MAXNOMPSDup | |
| MAXNOMATPdn | |
| MAXNOMATPup | |
| MAXRXPWRup | |
| PSDREF_a | Constant a for PSDREF calculation for UPBO |
| PSDREF_b | Constant b for PSDREF calculation for UPBO |
| PSDREF_klo | Electrical length for UPBO |
| CARMASKdn | |
| CARMASKup | |
| PSDMASKdn | |
| PSDMASKup | |
| BITCAPpsdn | Bit cap definition per subcarrier |
| BITCAPpsup | Bit cap definition per subcarrier |
| RFIBANDSdn | |
| RFIBANDSup | |
| TARSNRMdn | |
| TARSNRMup | |
| TARSNRpsdn | Target SNR margin definition per subcarrier |
| TARSNRpsup | Target SNR margin definition per subcarrier |
| MINSNRMdn | |
| MINSNRMup | |
| MAXSNRMdn | |
| MAXSNRMup | |
| RA-MODEdn | |
| RA-MODEup | |
| RA-USNRMdn | |
| RA-USDNMup | |
| RA-UTIMEdn | |

TABLE 3A-continued

Control parameters for CO or CPE configuration

| Parameter | Comments |
|---|---|
| RA-UTIMEup | |
| RA-DSNRMdn | |
| RA-DSNRMup | |
| RA-DTIMEdn | |
| RA-DTIMEup | |
| MSGMINdn | |
| MSGMINup | |
| BITSdn | |
| BITSup | |
| GAINSdn | |
| GAINSup | |
| TSSIdn | |
| TSSIup | |
| Minimum Data Rate | Defined per bearer channel (or latency path) |
| Minimum Reserved Data Rate | Defined per bearer channel (or latency path) |
| Maximum Data Rate | Defined per bearer channel (or latency path) |
| Delta Data Rate | Defined per bearer channel (or latency path) |
| Rate Adaptation Ratio | Defined per bearer channel (or latency path) |
| Minimum Data Rate in Low Power Mode | Defined per bearer channel (or latency path) |
| Maximum Interleaving Delay | Defined per bearer channel (or latency path) |
| Minimum INP | Defined per bearer channel (or latency path) |
| Maximum BER | Defined per bearer channel (or latency path) |
| Data Rate Threshold Upshift | Defined per bearer channel (or latency path) |
| Data Rate Threshold Downshift | Defined per bearer channel (or latency path) |
| Interleaver path settings | Defined per latency path. May include RS codeword size, parity bytes, interleaver depth, interleaver period. |
| Trellis transmit TU-C | Trellis encoding enabled for TU-C |
| Trellis receive TU-C | Trellis decoding enabled for TU-C |
| Trellis transmit TU-R | Trellis encoding enabled for TU-R |
| Trellis receive TU-R | Trellis decoding enabled for TU-R |
| Number of tones, cyclic prefix, cyclic suffix, transmitter/receiver window lengths, transmitter/receiver window coefficients, timing advance | |

TABLE 3B

Control parameters for Vectored DSL

| Category | Parameter | Comments |
|---|---|---|
| Vectoring System Enabled | Vectored lines | Enables lines for vectoring (lines defined as chipset/DSLAM ports), may include mapping from vectoring engine to DSLAM port |
| Vectoring Capabilities Enabled | FEXT cancellation dn | Enables capabilities of the vectored system (may include description of set of tones on which vectoring is applied) |
| | FEXT cancellation up | |
| | FEXT precoding dn | |
| | FEXT precoding up | |
| | NEXT cancellation dn | |
| | NEXT cancellation up | |
| | Noise decorrelation dn | |
| | Noise decorrelation up | |
| Phantom System Enabled | Lines with differential mode transmitter dn | Enables lines to use differential/common mode transmitters/receivers |
| | Lines with differential mode transmitter up | |
| | Lines with differential mode receiver dn | |

TABLE 3B-continued

Control parameters for Vectored DSL

| Category | Parameter | Comments |
|---|---|---|
| | Lines with differential mode receiver up | |
| | Lines with common mode transmitter dn | |
| | Lines with common mode transmitter up | |
| | Lines with common mode receiver dn | |
| | Lines with common mode receiver up | |
| Transmitter Vectoring - Feedforward module | Structure definition dn | Structure may be linear operations, complex rotations (rotors) |
| | Coefficients dn | Complex elements or angles |
| | Structure definition up | |
| | Coefficients up | |
| Transmitter Vectoring - Feedback module | Structure definition dn | Structure may include linear operations, modulo operations, dithering operations |
| | Coefficients dn | Complex elements |
| | Ordering dn | Ordering of lines |
| | Other parameters dn | Modulo or dithering parameter |
| | Structure definition up | |
| | Coefficients up | |
| | Ordering up | |
| | Other parameters up | |
| Receiver Vectoring - Feedforward module | Structure definition dn | Structure may be linear operations, or complex rotations (rotors) |
| | Coefficients dn | |
| | Structure definition up | |
| | Coefficients up | |
| Receiver Vectoring - Feedback module | Structure definition dn | Structure may include linear operations, modulo operations, dithering operations |
| | Coefficients dn | Complex elements |
| | Ordering dn | Ordering of lines |
| | Other parameters dn | Modulo or dithering parameter |
| | Structure definition up | |
| | Coefficients up | |
| | Ordering up | |
| | Other parameters up | |
| Matrix TEQ | Structure dn | |
| | Coefficients dn | |
| | Structure up | |
| | Coefficients up | |
| Vectoring adaptation | Frequency of "pilot" symbol dn | Frequency of special known symbol used for updating the vectoring configuration |
| | Frequency of "pilot" symbol up | |
| Training | Training sequences dn | Choose training sequence(s) used by each vectored line. Choice can be based on seed of pseudo-random noise generator (PRNG), or on coefficients of PRNG, or on index of preselected sequence. |
| | Training sequences up | |
| Order Swap | Dn | |
| | Up | |

In Table 3B, control parameters for the enablement of a phantom system are included. Phantom mode DSL operation is described in the above referenced U.S. patent application Ser. No. 11/267,623. A SMC may thus prefer to have control over the cases when phantom mode is enabled. A SMC can provide such control parameters to a vectored DSL device with phantom mode capabilities using embodiments of the invention.

The controls for "Transmitter Vectoring—Feedforward module" and/or for "Transmitter Vectoring—Feedforward module" may include appropriate parameters for reduced complexity structures such as tonal rotors, which are described in the above referenced U.S. patent application Ser. No. 11/284,692. A SMC can compute tonal rotors and provide such control parameters to a vectored DSL device using embodiments of the invention.

The controls for "Transmitter Vectoring—Feedback module" may include appropriate parameters for precoding structures such as those described in the above referenced U.S. patent application Ser. No. 11/336,666. A SMC can compute parameters for precoding structures and provide such control parameters to a vectored DSL device using embodiments of the invention.

The controls for "Receiver Vectoring—Feedback module" may include appropriate parameters for GDFE structures such as those described in the above referenced U.S.

patent application Ser. No. 11/336,113. A SMC may compute parameters for GDFE structures and provide such control parameters to a vectored DSL device using embodiments of the invention.

The controls in Table 3A allow for a seamless bring-up or introduction of a new line in a vectored DSL system. They also allow for an orderly shutdown of a line in a vectored DSL system. Such methods are described in the above referenced U.S. patent application Ser. No. 11/345,215.

Figures 13, 14:
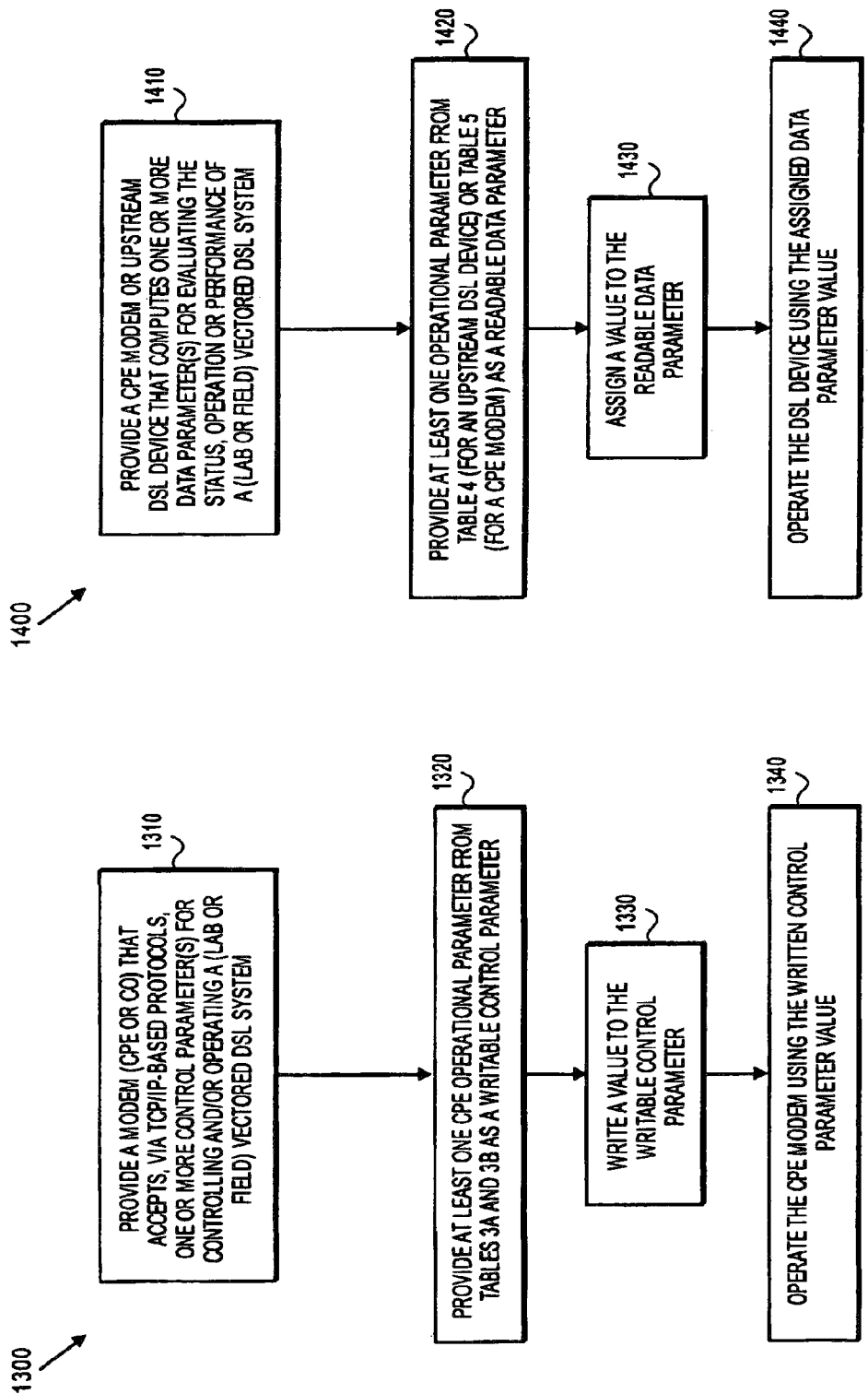
FIG. 13 illustrates a method for operating a DSL system in accordance with an embodiment of the invention.
FIG. 14 illustrates a method for operating a DSL system in accordance with an embodiment of the invention.

Therefore, using embodiments of the invention, as shown in FIG. 13, a method 1300 for operating a vectored DSL system may commence with providing at 1310 at least one modem device (for example, a CPE or CO device) that accepts, via a TCP/IP-based protocol, control parameters for controlling and/or operating the DSL system (or at least one or more DSL devices within the DSL system, which can be a lab or field DSL system). At least one operational parameter (for example, one or more of the parameters from Table 3A or Table 3B) can be provided at 1320 as a writable control parameter for the DSL device, allowing a value to be written at 1330 to the writable control parameter to create a written control parameter value. Thereafter at 1340 the DSL device may be operated using the written control parameter value. As with the other techniques disclosed herein, the DSL device can be any suitable device, including (but not limited to) a CPE modem, a DSLAM, a remote terminal, a line terminal, an Auto-Configuration Server, an Element Management System, or any other type of DSL modem usable in the system.

As noted above, conflicts can arise. Embodiments of the invention can resolve conflicts between the written control parameter value and a conflicting parameter value by using any suitable prioritization scheme, such as granting priority to the written control parameter value, granting priority to the conflicting parameter value, or re-initializing a DSL loop on which the DSL device operates, where re-initializing the DSL loop can include resetting the writable control parameter to a default parameter value. Re-initializing the DSL loop also can include reporting any parameter conflict to a controller. In some instances, the default parameter value may be the conflicting parameter value.

Control parameters for vectored DSL are not included in currently defined interfaces. These control parameters can be applied either at the CO modem (or Optical Network Unit, ONU, or Remote Terminal (RT) or at the CPE modem. They can be applied to the CPE side either using an in-band protocol (such as the Embedded Operations Channel, EOC, of ADSL/VDSL) or an out-of-band protocol (such as TCP/IP) operating at a higher layer of the network stack.

These embodiments of the invention can be applied to various parameters under G.997.1 and/or TR-069. As such, these methods also can be implemented as at least part of an interface between a DSL management entity and the DSL device. Various computer program products implementing one or more of the methods according to the invention can be realized by those skilled in the art.

The CPE parameters defined in TR-069 and the G.997.1 MIB elements do not include data parameters that are valuable for DSL management of vectored systems according to one or more embodiments of the invention. Lists of data parameters usable with a CPE modem or upstream device (for example, a DSLAM) for DSL configuration in connection with an embodiment of the invention are shown in Table 4, below. Lists of data parameters usable for vectored DSL (either with a CPE or a CO modem) are shown in Table 5, below.

TABLE 4

Data parameters for CO and CPE monitoring

| Parameter | Comments |
| --- | --- |
| Transmission System Capabilities TU-C | Indicates which among the transmission systems are supported |
| Transmission System Capabilities TU-R | Indicates which among the transmission systems are supported |
| Chipset vendor TU-C | |
| Chipset vendor TU-R | |
| Modem vendor TU-C | |
| Version number TU-C | |
| Serial number TU-C | |
| Self-test result TU-C | |
| Self-test result TU-R | |
| Loss-Of-Signal TU-C | |
| Loss-Of-Signal TU-R | |
| Loss-Of-Frame TU-C | |
| Loss-Of-Power TU-C | |
| Loss-Of-Power TU-R | |
| No cell delineation TU-C | |
| Loss of cell delineation TU-C | |
| FEC errors TU-C | |
| FEC errors TU-R | |
| Errored seconds TU-C | |
| Severely errored seconds TU-C | |
| Loss of signal seconds TU-C | |
| Loss of signal seconds TU-R | |
| Unavailable seconds TU-C | |
| Unavailable seconds TU-R | |
| Failed initialization counter | |
| Short initialization counter | |
| Failed short initialization counter | |
| Delineated cell count TU-C | |
| Delineated cell count TU-R | |
| User cell count TU-C | |
| User cell count TU-R | |
| Idle cell Bit Error count TU-C | |
| Idle cell Bit Error count TU-R | |
| Bit swap requests downstream | |
| Bit swap requests upstream | |
| Bit swaps performed downstream | |
| Bit swaps performed upstream | |
| Power management state | |
| Initialization success/failure cause | |
| Last state transmitted downstream | |
| Last state transmitted upstream | |
| LATNdn | |
| LATNup | |
| ACTPSDdn | |
| ACTPSDup | |
| ACTPSDpsdn | Actual PSD per subcarrier |
| ACTPSDpsup | Actual PSD per subcarrier |
| ACTATPdn | |
| HLINdn | |
| HLINup | |
| HLOGdn | |
| HLOGup | |
| QLNdn | |
| QLNup | |
| ECHOdn | |
| ECHOup | |
| SNRdn | |
| SNRup | |
| NOISEPARdn | |
| NOISEPARup | |
| BITSdn | |
| BITSup | |
| GAINSdn | |

TABLE 4-continued

Data parameters for CO and CPE monitoring

| Parameter | Comments |
|---|---|
| GAINSup | |
| TSSdn | |
| TSSup | |
| Previous data rate | Defined per bearer channel or latency path |
| Actual interleaving delay | Defined per bearer channel or latency path |
| Interleaver path settings | Defined per latency path. Includes RS codeword size, parity bytes, interleaver depth, interleaver period, other interleaver parameters. |
| Framing settings | All parameters associated with framing. |
| Trellis downstream | Trellis coding used for downstream |
| Trellis upstream | Trellis coding used for upstream |
| Ndn | Number of tones |
| Nup | Number of tones |
| CPdn | Cyclic prefix length |
| CPup | Cyclic prefix length |
| CSdn | Cyclic suffix length |
| CSup | Cyclic suffix length |
| TXWINLENdn | Transmitter window length |
| TXWINLENup | Transmitter window length |
| RXWINLENdn | Receiver window length |
| RXWINLENup | Receiver window length |
| TXWINdn | Transmitter window coefficients |
| TXWINup | Transmitter window coefficients |
| RXWINdn | Receiver window coefficients |
| RXWINup | Receiver window coefficients |
| TAdn | Timing advance |
| TAup | Timing advance |

TABLE 5

Data parameters for Vectored DSL monitoring

| Category | Parameter | Comments |
|---|---|---|
| Vectoring System Definition | Vectored lines | Indicates lines for a common vectoring (lines defined as chipset/DSLAM ports) |
| | Bonding | Indicates whether vectored lines are bonded |
| Vectoring Capabilities | FEXT cancellation dn | Indicates capabilities of the vectored system |
| | FEXT cancellation up | |
| | FEXT precoding dn | |
| | FEXT precoding up | |
| | NEXT cancellation dn | |
| | NEXT cancellation up | |
| | Noise decorrelation dn | |
| | Noise decorrelation up | |
| Vectoring Operations | FEXT cancellation dn | Indicates vectoring operations currently performed (may include description of set of tones on which vectoring is applied) |
| | FEXT cancellation up | |
| | FEXT precoding dn | |
| | FEXT precoding up | |
| | NEXT cancellation dn | |
| | NEXT cancellation up | |
| | Noise decorrelation dn | |
| | Noise decorrelation up | |
| Phantom System Capabilities | Lines with differential mode transmitter dn | Indicates which lines can use differential/common mode transmitters/receivers |
| | Lines with differential mode transmitter up | |
| | Lines with differential mode receiver dn | |
| | Lines with differential mode receiver up | |
| | Lines with common mode transmitter dn | |
| | Lines with common mode transmitter up | |
| | Lines with common mode receiver dn | |
| | Lines with common mode receiver up | |
| Phantom System Operations | Lines with differential mode transmitter dn | Indicates which lines actually use differential/common mode transmitters/receivers |
| | Lines with differential mode transmitter up | |
| | Lines with differential mode receiver dn | |
| | Lines with differential mode receiver up | |
| | Lines with common mode transmitter dn | |

TABLE 5-continued

Data parameters for Vectored DSL monitoring

| Category | Parameter | Comments |
|---|---|---|
| | Lines with common mode transmitter up | |
| | Lines with common mode receiver dn | |
| | Lines with common mode receiver up | |
| Vectoring restrictions | | Additional information about known equipment limitations with respect to vectoring implementation (e.g. vectoring only over subset of the tones, or vectoring only for 2 lines) |
| FEXT | Xlog, Xlin parameters dn | FEXT transfer functions among all lines of the vectored system (includes common mode when enabled) |
| | Xlog, Xlin parameters up | |
| NEXT | Nlog, Nlin parameters dn | NEXT transfer functions among all lines of the vectored system (includes common mode when enabled) |
| | Nlog, Nlin parameters up | |
| H | Hlog, Hlin parameters dn | The channel measurement is assumed to be synchronous such that relative phases of the elements of the channel H (for each subcarrier) are measured properly. |
| | Hlog, Hlin parameters up | |
| Noise covariance | Noise covariance matrix dn | Noise covariance matrix for all lines of the vectored system (includes common mode when enabled) |
| | Noise covariance matrix up | |

Therefore, using embodiments of the invention, as shown in FIG. 14, a method 1400 for operating a DSL system may commence with providing at 1410 at least one CPE modem or upstream DSL device (for example, a DSLAM) that computes one or more data parameter(s) for evaluating the status, operation or performance of a (lab or field) vectored DSL system. At least one operational parameter (for example, one or more of the parameters from Table 4 or Table 5) can be provided at 1420 as a readable data parameter for the DSL device, allowing a value to be assigned at 1430 to the readable data parameter to create an assigned data parameter value. Thereafter at 1440 the DSL device may be operated using the assigned data parameter value. As with the other techniques disclosed herein, the DSL device can be any suitable device, as will be appreciated by those skilled in the art, including in some cases (but not limited to) a CPE modem, a DSLAM, a remote terminal, a line terminal, a Auto Configuration Server, an Element Management System, or any other type of DSL modem usable in the system.

Generally, the SMC can be responsible for making the decision of choosing on which lines and on which tones vectoring should be applied and what vectoring techniques should be applied. The SMC can send appropriate instructions to a vectoring engine, the DSLAM, a DSL integrated circuit, or the switch. Such decisions are made after obtaining information about the loop and the deployed services, and about the equipment capabilities and restrictions. Such information is received from the vectoring engine, the DSLAM, or the DSL integrated circuit. Compared to the DSLAM, the SMC has an advantage in making these decisions, because it may have access to additional information.

The data parameters associated with the above functions include all those listed in Table 3B. The control parameters associated with the above functions include those listed in Table 5 under the categories Vectoring System Enabled, Vectoring Capabilities Enabled, and Phantom System Enabled.

These parameters can be supported as extensions of the currently defined G.997.1 and TR-069 interfaces. The additional bandwidth and memory requirements due to these parameters are rather modest. Finally, the acceptable latency for reading or writing these parameters is in the order of a few seconds, which is sufficient for embodiments of the invention.

As described in more detail below, a control unit implementing one or more embodiments of the invention can be part of a controller (for example, a DSL optimizer, dynamic spectrum manager or DSMC, spectrum management center, any one of which may be part of or comprise a DSL Management Entity). The controller and/or control unit can be located anywhere. In some embodiments, the controller and/or control unit reside in a DSL CO, while in other cases they may be operated by a third party located outside the CO. The structure, programming and other specific features of a controller and/or control unit usable in connection with embodiments of the invention will be apparent to those skilled in the art after reviewing the present disclosure.

A controller, such as a DSL Management Entity, DSL optimizer, dynamic spectrum management center (DSM Center), spectrum management center (SMC), a "smart" modem and/or computer system can be used to collect and analyze the operational data and/or parameter values as described in connection with the various embodiments of the invention. The controller and/or other components can be a computer-implemented device or combination of devices. In some embodiments, the controller is in a location remote from the modems. In other cases, the controller may be collocated with one of or both of the modems as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the embodiments of the invention use DSL systems as exemplary communications systems. Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the invention may be applied to various communications systems, and the invention is not limited to any particular system. The invention can be used in any data transmission system for which service quality may be related to control parameters.

Various network-management elements are used for management of DSL physical-layer resources, where elements refer to parameters or functions within an DSL modem pair, either collectively or at an individual end. A network-management framework consists of one or more managed nodes, each containing an agent. The managed node could be a router, bridge, switch, DSL modem or other device. At least one NMS (Network Management System), which is often called the manager, monitors and controls managed nodes and is usually based on a common PC or other computer. A network management protocol is used by the manager and agents to exchange management information and data. The unit of management information is an object. A collection of related objects is defined as a Management Information Base (MIB).

Figure 9:
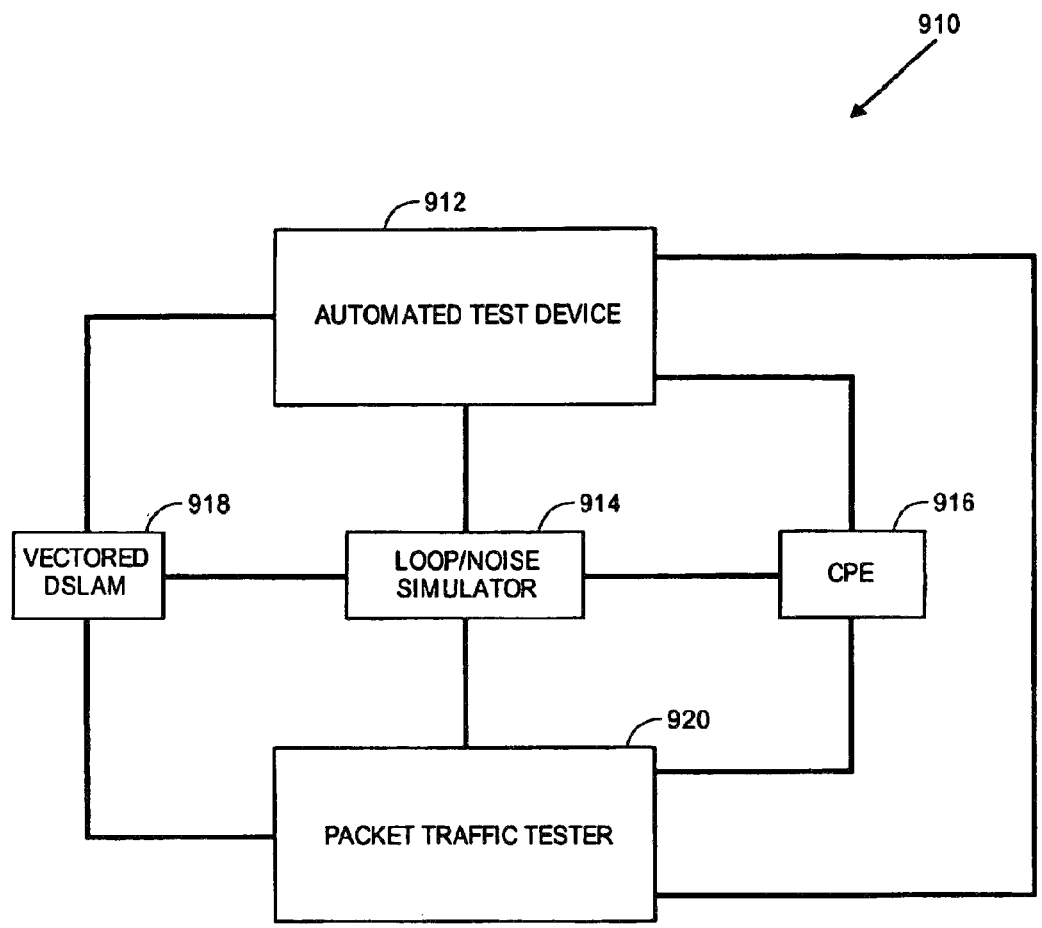
FIG. 9 illustrates a lab DSL configuration as may be utilized by an embodiment of the invention.

Embodiments of the invention may be used with "field" DSL systems as described above. Moreover, embodiments of the invention may be used with "lab" systems. FIG. 9 illustrates one such lab configuration 910. Automated testing equipment 912 is coupled to a loop/noise lab simulator 914. Such lab simulators are well known in the art and various capabilities can be used for replicating actual DSL loops or groups of loops, such as DSL binders and the like. Lab simulators are hardware and/or software equipment that simulate the behavior of the transmission environment. Testing equipment 912 can be hardware and/or software that control the other modules of lab system 910 and can collect measured data from these other devices. Device 912 also is coupled to at least one CPE modem 916 and a vectored DSLAM 918, as shown in FIG. 9. Each of these devices 916, 918 is coupled to the loop/noise lab simulator to recreate a given DSL loop. Finally, a packet traffic tester 920 is coupled to devices 912, 916, 918 to allow tester 920 to collect data from these various devices. Tester 920 is hardware and/or software that generates and tests packet traffic. This can be done for both upstream (CPE to DSLAM) traffic and downstream (DSLAM to CPE) traffic.

The configuration 910 can include appropriate connections among modules, as will be appreciated by those skilled in the art. For example, the connections between the DSLAM 918 and lab simulator 914 and between the CPE modem (or modems) 916 and lab simulator 914 can be short cable connections. The connections between the DSLAM 918 and packet traffic tester 920 and between the CPE modem (or modems) 916 and packet traffic tester 920 can be standard interfaces and connection means. The connection between the DSLAM 918 and automated testing device 912 can use interfaces, operational parameters, etc. defined by embodiments of the invention and/or G.997.1. Likewise, the connection between the CPE modem (or modems) 916 and automated testing device 912 can use interfaces, operational parameters, etc. defined by embodiments of the invention and/or TR-069. Finally, the connections between the lab simulator 914 and automated testing device 912 and between the packet traffic tester 920 and automated testing device 912 can be standard interfaces and connection means.

Embodiments of the invention can be used to automate testing of DSLAM and CPE equipment. Such techniques can make use of the interfaces defined by aspects of the invention discussed herein, TR-069 and/or G.997.1. As explained below, use of the invention is particularly advantageous in such testing in a lab system setting. One configuration for automated DSL equipment testing is shown in FIG. 9. Many DSL equipment tests can be defined by the following steps:
  (a) Configure the lab simulator;
  (b) Configure the DSLAM and CPE modem(s);
  (c) Configure the packet traffic tester (necessary in some tests only); and
  (d) Collect data from the DSLAM and the CPE modem(s).
Steps (b) and (d) may be repeated during the same test. Other variations on these methods will be apparent to those skilled in the art.

The configuration of FIG. 9 can be used to automate the process of testing DSL equipment. The automated test device 912 is used to control and coordinate the steps taken during each test. As will be appreciated by those skilled in the art, various tests can be performed to evaluate equipment and techniques that might arise in a "field" system setting and to verify the capabilities of different types of equipment. Specifically, for each test, the automated test device performs the following:
  Sends commands to the lab simulator to specify the loop and noise conditions;
  Uses control parameters of the invention, G.997.1, TR-069 and/or some other interface suitable for vectored DSL to configure the DSLAM and CPE modem(s) as specified in the test definition;
  Sends commands to the packet traffic tester to commence traffic generation and testing; and/or
  Uses the data parameters of the invention, G.997.1, TR-069 and/or some other interface suitable for vectored DSL to collect measurements from the DSLAM and CPE modem(s).
After the test's conclusion, the collected measurements can be compared against expected values to produce a pass/fail result. In other cases, the collected measurements can be used for other purposes, as will be appreciated by those skilled in the art.

Embodiments of the invention possess a number of advantages as compared with other methods for verification testing. Significant benefits can be realized in the approach described above through the use of the interfaces and/or operational parameters of the invention, G.997.1, TR-069 and/or some other interface suitable for vectored DSL for:
  Configuring the control parameters of the DSLAM and CPE; and
  Collecting data parameters from the DSLAM and CPE.
The use of the invention for the above purposes is particularly advantageous for various reasons, some of which are outlined below.

Single interface—An alternative approach for accessing the control and data parameters of the DSLAM and CPE modem(s) is to use proprietary interfaces of the corresponding DSLAM and CPE modem(s). It is preferable to use the interface of the invention for vectoring systems compared to having a multitude of proprietary interfaces with different DSLAM and CPE modem(s).

Timestamp capability—Among the standardized interfaces, neither G.997.1 nor TR-069 has a timestamp capability described above (for example, to specify the time of data collection, or the time of application of control parameters). The invention overcomes this obstacle, which significantly facilitates verification testing.

Customized data collection capability—Compared to G.997.1 and TR-069, the invention has available the extra capability of customized data collection, which means that data collection can be tailored to fit the needs of each verification test. Data parameters can be collected at just the right frequency, thus avoiding collecting too much data on one hand, or collecting data too infrequently on the other hand.

Extended sets of data and control parameters—Compared to G.997.1 and TR-069, the invention has many additional control and data parameters. This boosts the capabilities of the automated test device to configure the DSLAM and CPE modem(s) for verification testing. It also enhances the set of measurements that can be obtained from the DSLAM and CPE modem(s), thus making possible the automation of many more verification tests.

Generally, embodiments of the invention employ various processes involving data stored in or transferred through one or more computer systems, which may be a single computer, multiple computers and/or a combination of computers (any and all of which may be referred to interchangeably herein as a "computer" and/or a "computer system"). Embodiments of the invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bit streams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the invention these operations are machine operations. Useful machines for performing the operations of embodiments of the invention include general purpose digital computers or other similar devices. In all cases, there should be borne in mind the distinction between the method of operations in operating a computer and the method of computation itself. Embodiments of the invention relate to method steps for operating a computer in processing electrical or other physical signals to generate other desired physical signals.

Embodiments of the invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the invention further relate to computer readable media that include program instructions for performing various computer-implemented operations. The media and program instructions may be those specially designed and constructed for the purposes of the invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 17:
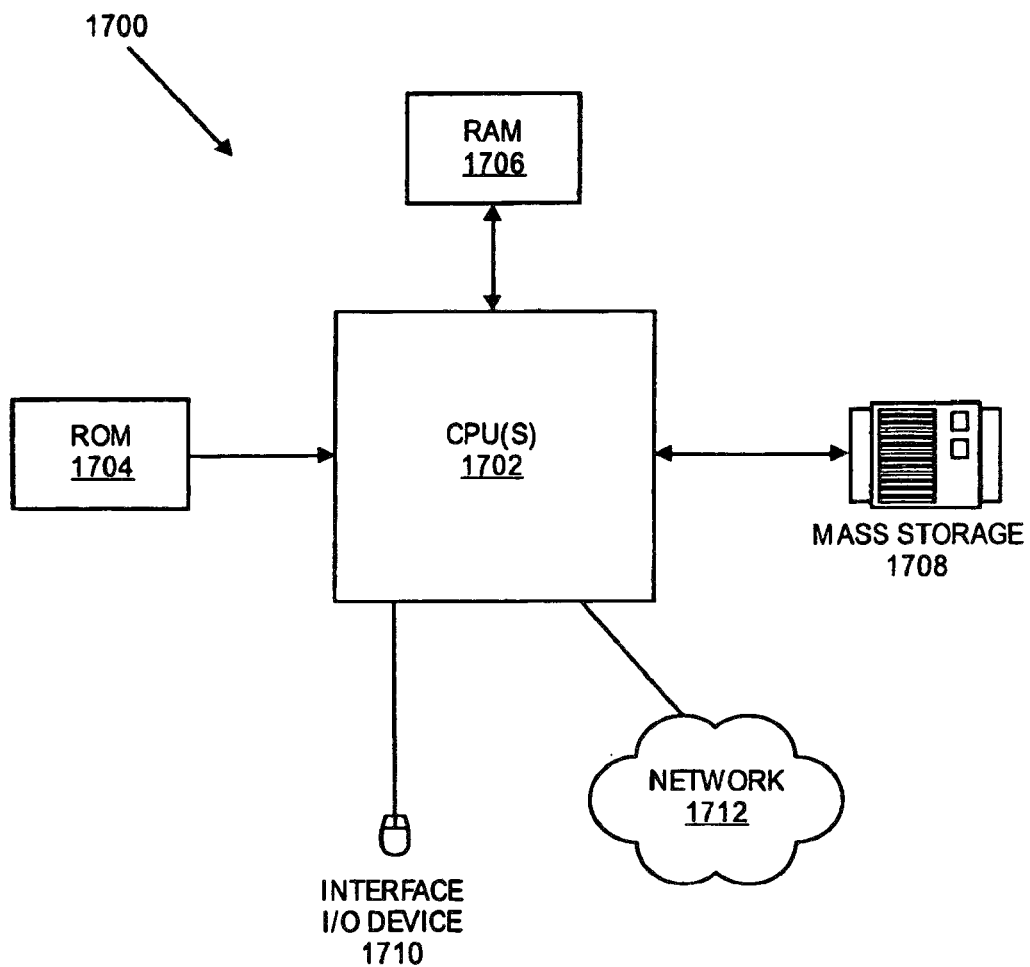
FIG. 17 illustrates a computer system for use by a user and/or controller in accordance with one or more embodiments of the invention.

FIG. 17 illustrates a typical computer system that can be used by a user and/or controller in accordance with one or more embodiments of the invention. The computer system 1700 includes any number of processors 1702 (also referred to as central processing units, or CPUs) that are coupled to storage devices including primary storage 1706 (typically a random access memory, or RAM), primary storage 1704 (typically a read only memory, or ROM). As is well known in the art, primary storage 1704 acts to transfer data and instructions uni-directionally to the CPU and primary storage 1706 is used typically to transfer data and instructions in a bi-directional manner. Both of these primary storage devices may include any suitable of the computer-readable media described above. A mass storage device 1708 also is coupled bi-directionally to CPU 1702 and provides additional data storage capacity and may include any of the computer-readable media described above. The mass storage device 1708 may be used to store programs, data and the like and is typically a secondary storage medium such as a hard disk that is slower than primary storage. It will be appreciated that the information retained within the mass storage device 1708, may, in appropriate cases, be incorporated in standard fashion as part of primary storage 1706 as virtual memory. A specific mass storage device such as a CD-ROM 1714 may also pass data uni-directionally to the CPU.

CPU 1702 also is coupled to an interface 1710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1702 optionally may be coupled to a computer or telecommunications network using a network connection as shown generally at 1712. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 1708 or 1714 and executed on CPU 1702 in conjunction with primary memory 1706. In a preferred embodiment, the controller is divided into software submodules.

The many features and advantages of the invention are apparent from the written description, and thus, the appended claims are intended to cover all such features and advantages of the invention. Further, since numerous modifications and changes will readily occur to those skilled in the art, the invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A Digital Subscriber Line (DSL) optimizer coupled in communication with a DSL system, wherein the DSL optimizer comprises:
    a collection circuit to collect operational data from the DSL system, wherein a timestamp is appended to one or more operational parameters associating the timestamp with relevant data in the collected operational data;
    an analysis circuit to perform analysis regarding further operation of the DSL system based on the collected operational data;
    wherein the DSL optimizer is configured to identify cross-talk between lines in the DSL system based on the analysis; and
    a signal generator configured to generate and send instruction signals to modems or other components of the DSL system, wherein the signal generator is configured to send instructions to place the lines into groups based on the cross-talk identified between the lines, wherein the lines with similar cross-talk on at least one other line are placed into a same group.

2. The DSL optimizer of claim 1, wherein the similar cross-talk is low cross-talk on at least one other line.

3. The DSL optimizer of claim 1, wherein the similar cross-talk is high cross-talk on at least one other line, or have highly correlated noise signals relative to at least one other line.

4. The DSL optimizer of claim 1, wherein the DSL optimizer is configured to operate on or in connection with a Vectored Digital Subscriber Line Access Multiplexer (DSLAM), within the DSL system, wherein the Vectored DSLAM is separate from the DSL optimizer, and wherein the Vectored DSLAM is on the premises of a telecommunication company.

5. The DSL optimizer of claim 1, further comprising:
    a profile selector circuit to select and implement profiles specifying data or control parameters, wherein the profiles and any other instructions are selected under the control of the DSL optimizer, and wherein profiles selected by the profile selector are implemented in the Vectored Digital Subscriber Line Access Multiplexer or any other appropriate DSL system component equipment.

6. The DSL optimizer of claim 1, wherein the signal generator is configured to send instructions to place the lines into groups based on the cross-talk identified between the lines by sending the instructions to a Vectored Digital Subscriber Line Access Multiplexer (DSLAM) within the DSL system, separate from the DSL optimizer, wherein the Vectored DSLAM is configured to perform vectoring on a plurality of Customer Premises Equipment (CPE) devices coupled with the Vectored DSLAM via a corresponding plurality of DSL loops.

7. The DSL optimizer of claim 6, wherein the signal generator is configured to send the instructions to the Vectored DSLAM within the DSL system by sending transmitter vectoring operations for downstream operation to an interface of the Vectored DSLAM or sending receiver vectoring operations for upstream operation to the interface of the Vectored DSLAM.

8. The DSL optimizer of claim 6, wherein the signal generator is configured to send the instructions to the Vectored DSLAM within the DSL system by sending control parameters computed by a controller of the DSL optimizer responsive to the collected operational data, wherein the collected operational data comprises at least one of the following:
    Quality of Service data, wherein the Quality of Service data comprises at least one of customer data rates, customer delay data, customer priorities data or customer class of service data;
    error counters; current rate data; current margin data; status data;
    test parameter data; diagnostics data; performance data; maximum attainable data rate data;
    Xlog data; or
    noise correlation data.

9. The DSL optimizer of claim 1, wherein the signal generator further communicates with a plurality of Customer Premises Equipment devices, CPE devices, operating within the DSL system via interface at each of the respective CPE devices.

10. The DSL optimizer of claim 1,
    wherein the timestamp that is appended to the operational parameters is then used in operating the DSL system.

11. The DSL optimizer of claim 10, wherein the timestamp that is appended to the operational parameters is one of:
    a phase identification or a time reference, wherein the phase identification can identify the operating mode the vectored DSL system was in when the data parameter was last updated;
    a temporal description regarding a phase of operation, wherein operating modes include diagnostics, normal initialization, and showtime;
    a point in time defined by absolute time;
    a point relative to one or more phase transitions;
    a point in time defined relative to one or more phase-defined events;
    a time reference defined in terms of DMT superframes or DMT sync symbols;

information regarding whether an update in the operational parameters will force initialization;

information regarding when the update will be enforced or implemented; or information regarding any delay between a known time reference and the enforcement or implementation of the update.

12. A method in a Digital Subscriber Line (DSL) optimizer coupled in communication with a DSL system, wherein the method comprises:

obtaining, via a collecting module, operational data relating to a plurality of DSL loops within the DSL system, wherein a timestamp is appended to one or more operational parameters associating the timestamp with relevant data in the collected operational data;

providing the operational data to an analysis module for analysis regarding further operation of the DSL system based on the collected operational data;

identifying cross-talk between two or more of the plurality of DSL loops within the DSL system based on the analysis; and sending instructions to a vectoring engine to place the plurality of DSL loops into groups based on the cross-talk identified between the plurality of DSL loops and to apply vectoring to one or more of the DSL loops, wherein the DSL loops from the plurality of DSL loops that have similar cross-talk on at least one other DSL loop are placed into a same group.

13. The method of claim 12, wherein the similar cross-talk is low cross-talk on at least one other DSL loop.

14. The method of claim 12, wherein the similar cross-talk is high cross-talk on at least one other DSL loop, or have highly correlated noise signals relative to at least one other DSL loop, wherein the instructions instruct the vectoring engine to apply vectoring to the DSL loops having the strongest crosstalk coupling or strongest noise correlation there between.

15. The method of claim 12, further comprising:

selecting and implementing profiles specifying data or control parameters, wherein the profiles and any other instructions are selected under the control of the DSL optimizer, and wherein the profiles are implemented in the Vectored DSLAM or any other appropriate DSL system component equipment separate from the DSL optimizer.

16. The method of claim 12, further comprising:

providing output to an administrator sufficient to properly route one or more of the plurality of DSL loops to a particular vectoring engine within the DSL system.

17. The method of claim 12, wherein the instructions comprise one or more of:

an ordering instruction for receiver vectoring operations;

an ordering instruction for transmitter vectoring operations; or instructions to enable Far-end Crosstalk (FEXT) cancellation in the downstream direction for the vectoring engine.

18. The method of claim 12, further comprising:

sending instruction signals and control parameters to the vectoring engines to perform vectoring operations on a subset of the lines of the vectored system, or on a subset of the tones of the vectored system.

19. The method of claim 12, wherein sending instructions to apply vectoring to one or more of the DSL loops includes instructions regarding acceptable data rates, transmit power levels, or coding and latency requirements.

20. The method of claim 12, further comprising modifying at least one of the following parameters for at least one of the respective DSL loops: data rate;

margin; spectrum; carrier mask; delay; training sequence; or impulse noise protection.

21. Non-transitory computer readable storage media having instructions stored thereon that, when executed by a processor of a Digital Subscriber Line (DSL) optimizer coupled in communication with a DSL system, the instructions cause the DSL optimizer to perform operations including:

obtaining, via a collecting module, operational data relating to a plurality of DSL loops within the DSL system, wherein a timestamp is appended to one or more operational parameters associating the timestamp with relevant data in the collected operational data;

providing the operational data to an analysis module for analysis regarding further operation of the DSL system based on the collected operational data;

identifying cross-talk between two or more of the plurality of DSL loops within the DSL system based on the analysis; and sending instructions to a vectoring engine to place the plurality of DSL loops into groups based on the cross-talk identified between the plurality of DSL loops and to apply vectoring to one or more of the DSL loops, wherein the DSL loops from the plurality of DSL loops that have similar cross-talk on at least one other DSL loop are placed into a same group.

22. The non-transitory computer readable media of claim 21, wherein the similar cross-talk is low cross-talk on at least one other DSL loop and have nearly uncorrelated noise signals relative to at least one other DSL loop.

23. The non-transitory computer readable media of claim 21, wherein the similar cross-talk is high cross-talk on at least one other DSL loop, or have highly correlated noise signals relative to at least one other DSL loop, wherein the instructions instruct the vectoring engine to apply vectoring to the DSL loops having the strongest crosstalk coupling or strongest noise correlation there between.

* * * * *